(12) United States Patent
Ogaki

(10) Patent No.: US 7,425,969 B2
(45) Date of Patent: *Sep. 16, 2008

(54) INFORMATION PROCESSING APPARATUS, INFORMATION PROCESSING METHOD AND PROGRAM STORAGE MEDIUM

(75) Inventor: Tadao Ogaki, Chiba (JP)

(73) Assignee: Sony Corporation, Tokyo (JP)

( * ) Notice: Subject to any disclaimer, the term of this patent is extended or adjusted under 35 U.S.C. 154(b) by 708 days.

This patent is subject to a terminal disclaimer.

(21) Appl. No.: 11/106,981

(22) Filed: Apr. 15, 2005

(65) Prior Publication Data

US 2005/0187706 A1    Aug. 25, 2005

Related U.S. Application Data

(63) Continuation of application No. 09/943,126, filed on Aug. 29, 2001, now Pat. No. 6,912,462.

(30) Foreign Application Priority Data

Aug. 31, 2000   (JP)   ............... 2000-262298
Aug. 31, 2000   (JP)   ............... 2000-262299

(51) Int. Cl.
    *G09G 5/00*   (2006.01)
(52) U.S. Cl. .................................. 345/660
(58) Field of Classification Search ......... 701/208–212, 701/202; 340/995.12, 995.14; 345/427, 345/440, 600, 660, 666, 667
See application file for complete search history.

(56) References Cited

U.S. PATENT DOCUMENTS

| | | | |
|---|---|---|---|
| 4,924,402 A | 5/1990 | Ando et al. | |
| 5,168,452 A | 12/1992 | Yamada et al. | |
| 6,058,390 A | 5/2000 | Liaw et al. | |
| 6,092,076 A | 7/2000 | McDonough et al. | |
| 6,498,982 B2 | 12/2002 | Bellesfield et al. | |

FOREIGN PATENT DOCUMENTS

| | | |
|---|---|---|
| EP | 0 436 263 | 7/1991 |
| EP | 0 559 270 | 9/1993 |
| EP | 1 134 674 | 9/2001 |

OTHER PUBLICATIONS

Lorensen L: "Using the common benefits from land information systems in the planning of a geographic facility management system" CIRED 1989. 10th International Conference on Electricity Distribution (Conf. Publ. No. 305), Brighton, UK, May 8-12, 1989, pp. 505-509, vol. 6, XP001147087 1989, London, UK, IEEE, UK.

(Continued)

*Primary Examiner*—Amr Awad
*Assistant Examiner*—Jeff Pelligrino
(74) *Attorney, Agent, or Firm*—Frommer Lawrence & Haug LLP; William S. Frommer; Thomas F. Presson

(57) ABSTRACT

Map data are managed by use of map file names representing given areas. In each map file name, the first character denotes a map structure code; the second character represents a zoom level for a zoom-in or zoom-out operation of the map on display; and the third through the fifth character stand for an X-direction unit code and the sixth through the eighth character for a Y-direction unit code, indicating where the map in question is located on the same zoom level. The eight-byte file name plus a three-byte extension constitutes each map file name. Furthermore, map data are managed by use of floor file names representing floors in buildings. In each floor file name, the first through the third character denote a building ID code; the fourth and the fifth character represent a floor code for identifying a floor inside the building; the sixth character code stands for a zoom level for a zoom-in or zoom-out operation of the displayed floor map; and the seventh and the eighth character represent an X- and a Y-direction unit code respectively, indicating where the floor map in question is located on the same zoom level. The eight-byte file name plus a three-byte extension constitutes each floor file name.

1 Claim, 33 Drawing Sheets

OTHER PUBLICATIONS

T. Schurle, D. Fritsch: "CAFM Data Structures: A Review and Examples" IAPRS, 'Online! Aug. 17, 2000, pp. 909-916, XP002291844 Amsterdam Retrieved from the Internet: URL:http://www.ifp.uni-stuttgart.de/publications/2000/Schuerle_1586.pdf> retrieved on Aug. 9, 2004!

T.A. Funkhouser et al: "Management of large amounts of data in Interactive building walkthroughs" Proceedings of the 1992 Symposium on Interactive 3D Graphics, 1992, pp. 11-20, XP002291845 Cambridge, MA, USA, ISBN: 0897914678.

Zlatanova, S.: "VRML for 3D GIS" Proceedings of the 15$^{th}$ Spring Conference on Computer Graphics, Apr. 28, 1999, May 1, 1999 pp. 74-82, XP002461146 Budmerice, Slovakia.

Conley J B et al: "Integration of Fire Operations with IT and GIS: GIS Component to Support E911 in Fire Apparatus" URISA Proceedings, 1998, pp. 123-130, XP002249158.

Newman D: "Integrated Fire Operations With IT and GIS: City of Winston-Salem Integrated Network Fire Operations Overview" URISA Proceedings, 1998, pp. 118-122, XP001153917.

FIG. 12

| DECIMAL NUMBERS | NUMBERS WITH RADIX 32 | BINARY NUMBERS | DECIMAL NUMBERS | NUMBERS WITH RADIX 32 | BINARY NUMBERS |
|---|---|---|---|---|---|
| 0 | 0 | 00000 | 16 | G | 10000 |
| 1 | 1 | 00001 | 17 | H | 10001 |
| 2 | 2 | 00010 | 18 | I | 10010 |
| 3 | 3 | 00011 | 19 | J | 10011 |
| 4 | 4 | 00100 | 20 | K | 10100 |
| 5 | 5 | 00101 | 21 | L | 10101 |
| 6 | 6 | 00110 | 22 | M | 10110 |
| 7 | 7 | 00111 | 23 | N | 10111 |
| 8 | 8 | 01000 | 24 | O | 11000 |
| 9 | 9 | 01001 | 25 | P | 11001 |
| 10 | A | 01010 | 26 | Q | 11010 |
| 11 | B | 01011 | 27 | R | 11011 |
| 12 | C | 01100 | 28 | S | 11100 |
| 13 | D | 01101 | 29 | T | 11101 |
| 14 | E | 01110 | 30 | U | 11110 |
| 15 | F | 01111 | 31 | V | 11111 |

FIG.13

| | ZOOM LEVEL | LEVEL BIT |
|---|---|---|
| HIGHER ↑<br><br>↓ LOWER | F | — |
| | E | 15 |
| | D | 14 |
| | C | 13 |
| | B | 12 |
| | A | 11 |
| | 9 | 10 |
| | 8 | 9 |
| | 7 | 8 |
| | 6 | 7 |
| | 5 | 6 |
| | 4 | 5 |
| | 3 | 4 |
| | 2 | 3 |
| | 1 | 2 |
| | 0 | 1 |

FIG. 16

| |
|---|
| GEODETIC SYSTEM |
| MAP X-DIRECTION DOT COUNT |
| MAP Y-DIRECTION DOT COUNT |
| MAP X-DIRECTION CENTER REAL DISTANCE |
| MAP Y-DIRECTION CENTER REAL DISTANCE |
| OPERATION |
| MAP BOTTOM LEFT CORNER LATITUDE |
| MAP BOTTOM LEFT CORNER LONGITUDE |
| MAP TOP LEFT CORNER LATITUDE |
| MAP TOP LEFT CORNER LONGITUDE |
| MAP TOP RIGHT CORNER LATITUDE |
| MAP TOP RIGHT CORNER LONGITUDE |
| MAP BOTTOM RIGHT CORNER LATITUDE |
| MAP BOTTOM RIGHT CORNER LONGITUDE |

HEADER INFORMATION

SCROLLING ON THE SAME FLOOR

SCROLLING ON THE SAME FLOOR

FLOOR FILE NAME
○○○○○○○○.×××
— EXTENSION
— Y-DIRECTION UNIT CODE
— X-DIRECTION UNIT CODE
— ZOOM LEVEL
— FLOOR CODE
— BUILDING ID CODE

| ZOOM LEVEL | LEVEL BIT |
|---|---|
| 5 | — |
| 4 | 5 |
| 3 | 4 |
| 2 | 3 |
| 1 | 2 |
| 0 | 1 |

FIG. 32

| X-DIRECTION DOT COUNT |
| --- |
| Y-DIRECTION DOT COUNT |
| X-DIRECTION REAL DISTANCE |
| Y-DIRECTION REAL DISTANCE |
| ORIENTATION |
| LATITUDE OF FLOOR MAP BOTTOM LEFT CORNER |
| LONGITUDE OF FLOOR MAP BOTTOM LEFT CORNER |
| LATITUDE OF FLOOR MAP TOP LEFT CORNER |
| LONGITUDE OF FLOOR MAP TOP LEFT CORNER |
| LATITUDE OF FLOOR MAP TOP RIGHT CORNER |
| LONGITUDE OF FLOOR MAP TOP RIGHT CORNER |
| LATITUDE OF FLOOR MAP BOTTOM RIGHT CORNER |
| LONGITUDE OF FLOOR MAP BOTTOM RIGHT CORNER |
| HIGHEST FLOOR ABOVE GROUND |
| LOWEST BASEMENT LEVEL |

HEADER INFORMATION

INFORMATION PROCESSING APPARATUS, INFORMATION PROCESSING METHOD AND PROGRAM STORAGE MEDIUM

This is a continuation of application Ser. No. 09/943,126, filed Aug. 29, 2001 now U.S. Pat. No. 6,912,462, the entirety of which is incorporated herein by reference.

BACKGROUND OF THE INVENTION

The present invention relates to an information processing apparatus, an information processing method and a program storage medium. More specifically, the invention relates to an information processing apparatus, an information processing method and a program storage medium for use with a device that offers map information to users.

Maps commonly used in paper form generally emphasize topographical features as well as buildings and structures above the ground surface. These maps have been digitized recently for use on PCs and like equipment. The map data in digital form called digital maps (as in the ensuing description where appropriate) can be used by devices popularly known as navigation systems. Using the data, such devices can readily search for desired locations and for routes to preferred destinations.

The map data in digital form are most often recorded on mass storage media such as CD-ROMs (compact disc-read only memories) and DVDs (digital video discs). The entire map data recorded on such a storage medium are regarded either as a single file or as a continuous data stream. For that reason, the map data representing, say, Japan as a whole can amount to a huge file size.

The colossal, cumbersome map size may be circumvented illustratively by dividing map data into a plurality of files upon recording. One disadvantage of this method is that although the size of each divided file is small, a management file is needed to manage the resulting multiple files. The management file itself can become considerable in size.

When files are oversized, devices with modest processing capabilities or limited storage capacities are incapable of displaying maps based on the file or may give map displays but only after an interminable boot-up time. Where portable devices are used to download map data over a network for display, a large file size necessarily prolongs the download time.

If map data are managed by use of a plurality of files, only the necessary file needs to be downloaded in a relatively short time. However, it is also necessary to download a management file for handling the file in question, which can amount to a drawn-out download time after all.

Furthermore the digital maps, as in the case of maps in paper form, express primarily topographical features and buildings and structures on the ground surface. These topographically oriented, landmark-based digital maps were stored more or less appropriately by conventional map data storage methods. These methods are no longer suitable for map data that deal with, say, shop floor plans inside buildings and other detailed features.

The inability of the conventional methods to store floor-wise shop layout plans within buildings and structures as digital maps entails obvious disadvantages. With digital maps on display, it is impossible to change views from one floor to another within a building; to enlarge, reduce or scroll any given floor layout; or to look up underground shopping mall arrangements or other specifically desired details.

SUMMARY OF THE INVENTION

It is therefore an object of the present invention to overcome the above and other deficiencies of the prior art and to provide an information processing apparatus, an information processing method and a program storage medium for creating file names intended to manage map data, each file name being constituted by a code for identifying a building, a code for identifying a specific floor in the building of interest, and a code for designating a zoom level, thereby offering easy-to-handle map data representing plans and layouts within buildings and structures and in underground shopping centers.

It is another object of the present invention to provide an information processing apparatus, an information processing method and a program storage medium for creating file names intended to manage map data, each file name being constituted by a code for distinguishing one coherent map group from another and a code for designating a zoom-in or zoom-out level, thereby allowing a desired map to be displayed using only the essential map data.

Other objects, features and advantages of the invention will become more apparent upon a reading of the following description and appended drawings.

BRIEF DESCRIPTION OF THE DRAWINGS

FIG. 12 is a table of radix conversions;

FIG. 13 is a tabular view of correspondence between zoom levels and level bits;

FIG. 16 is a schematic view showing header information;

FIG. 32 is a schematic view showing header information;

DESCRIPTION OF THE PREFERRED EMBODIMENTS

Figure 1:
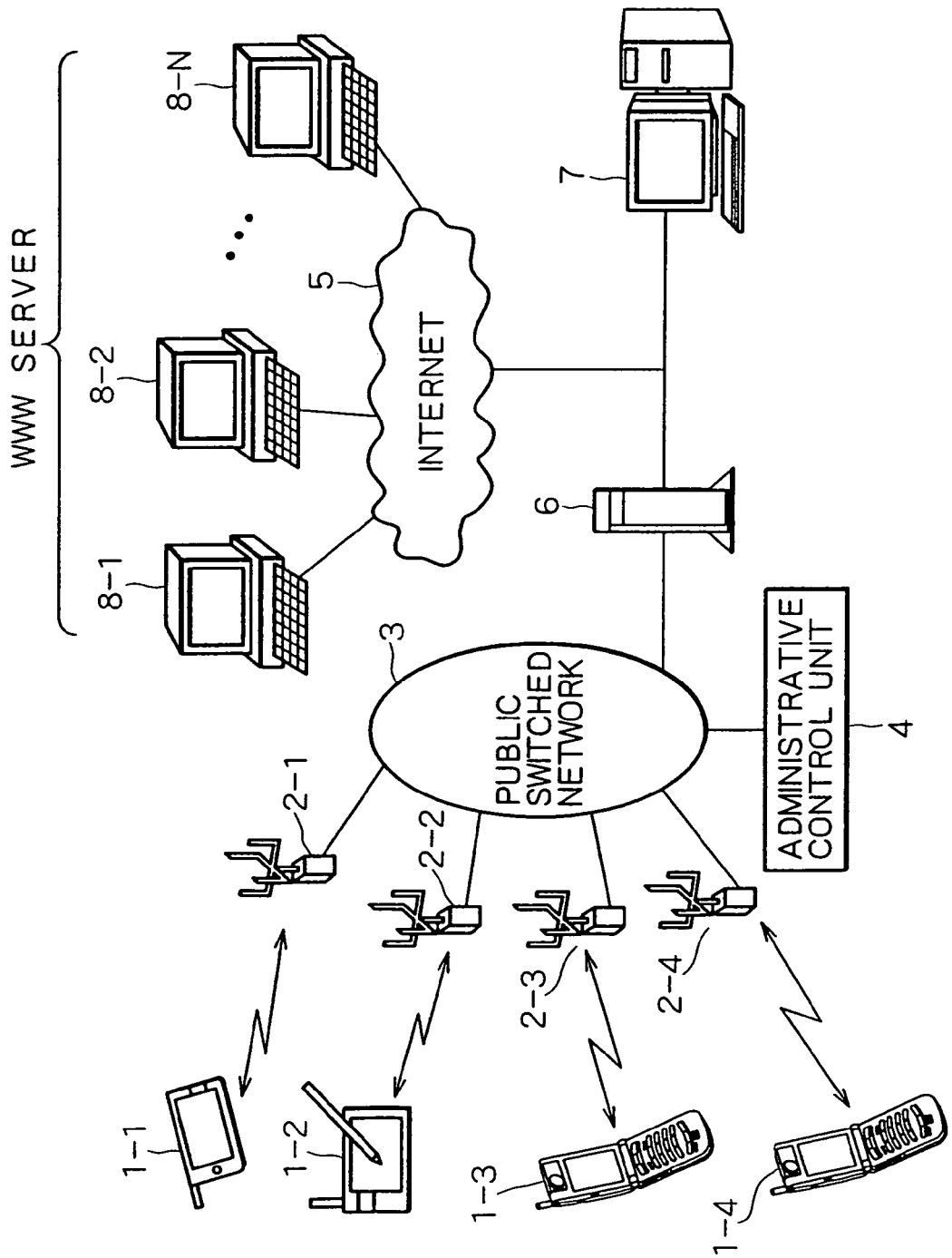
FIG. 1 is a schematic view of a typical network system according to the invention.

Preferred embodiments of this invention will now be described with reference to the accompanying drawings. FIG. 1 is a schematic view of a typical information processing system embodying the invention. The system in FIG. 1 is a network system to which portable data terminals 1-1 through 1-4 are connected. The network system covers a communication service area divided into cells of a suitable size each, the cells having base stations 2-1 through 2-4 (stationary wireless stations) established therein. The base stations 2-1 through 2-4 are connected wirelessly to the portable data terminals 1-1 through 1-4 acting as mobile wireless stations on a W-CDMA (Wideband-Code Division Multiple Access) basis. In this setup, large quantities of data are transferred between stations and terminals at speeds as high as 2 Mbps using a frequency band of 2 GHz.

Because of their ability to communicate massive data at high speeds on the W-CDMA principle, the portable data terminals 1-1 through 1-4 may not only make voice calls but also send and receive electronic mails, browse websites in simple format, exchange images, and communicate other diverse kinds of data including TV programs received as will be described later.

The base stations 2-1 through 2-4 are wired to a public switched network 3. The public switched network 3 is connected to the Internet 5 as well as to numerous wired subscriber terminals, computer networks, and local area networks, not shown. The public switched network 3 is also connected to access servers 6 of Internet service providers. The access server 6 of each Internal service provider is connected to the ISP's content data server 7.

The content data server 7 provides content data about simple-format websites illustratively in the form of compact HTML (Hyper Text Markup Language) files in response to requests from the wired subscriber terminals or from the portable data terminals 1-1 through 1-4.

The Internet 5 is connected to a large number of WWW servers 8-1 through 8-N. These servers may be accessed over the Internet 5 by any of the wired subscriber terminals or the portable data terminals 1-1 through 1-4 in accordance with TCP/IP (Transmission Control Protocol/Internet Protocol).

The portable data terminals 1-1 through 1-4 communicate with the base stations 2-1 through 2-4 in accordance with a 2-Mbps simple transport protocol. The base stations 2-1 through 2-4 communicate with the WWW servers 8-1 through 8-N in keeping with TCP/IP over the Internet 5.

An administrative control unit 4 is connected to the wired subscriber terminals and to the portable data terminals 1-1 through 1-4 via the public switched network 3. Thus connected, the administrative control unit 4 performs authentication and accounting processes regarding the wired subscriber terminals and the portable data terminals 1-1 through 1-4.

Figure 2:
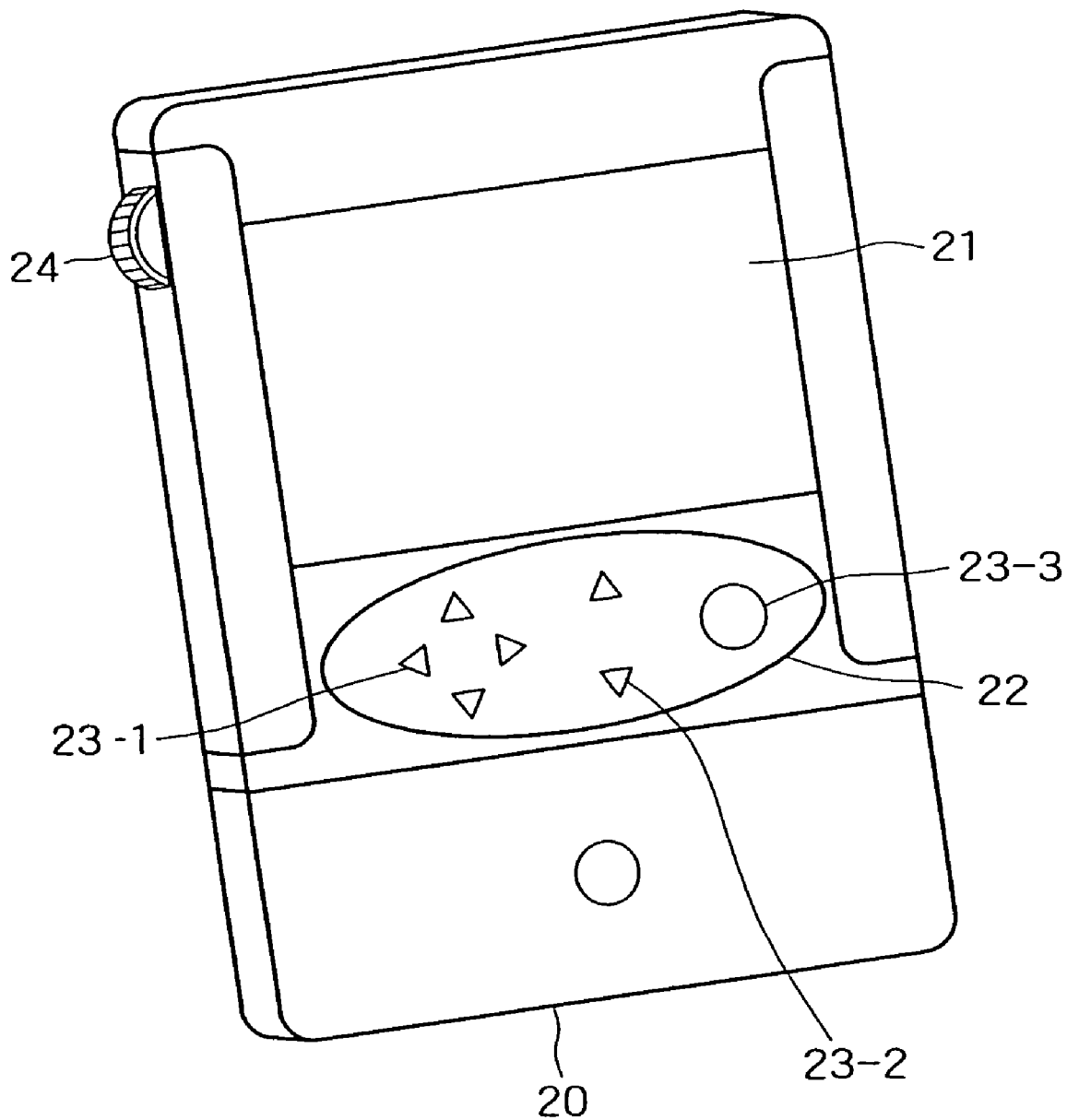
FIG. 2 is an external view of a PDA.

The portable data terminals 1-1 through 1-4 will now be described. The portable data terminals 1-1 and 1-2 are each a so-called PDA (Personal Digital Assistant) whose external view is shown in FIG. 2. The PDA 20 representative of the portable data terminal 1-1 or 1-2 has a display unit 21, keys 22, and a jog dial 24, as illustrated in FIG. 2. The keys 22 made up of scroll keys 23-1, zoom keys 23-2 and an enter key 23-3 are used to display maps on the PDA 20 for necessary processing, as will be described later.

The display unit 21 is constituted by a thin display device such as a liquid crystal display, and displays images including icons, thumbnail images and text. A touch panel is furnished on the display unit 21. The keys 22 include a microphone in addition to the input keys. These controls are operated to select icons or thumbnail images displayed on the display unit 21. The jog dial 24 is rotated or pushed into the body to select icons or thumbnail images or to make other entries on the display unit 21.

Figure 3:
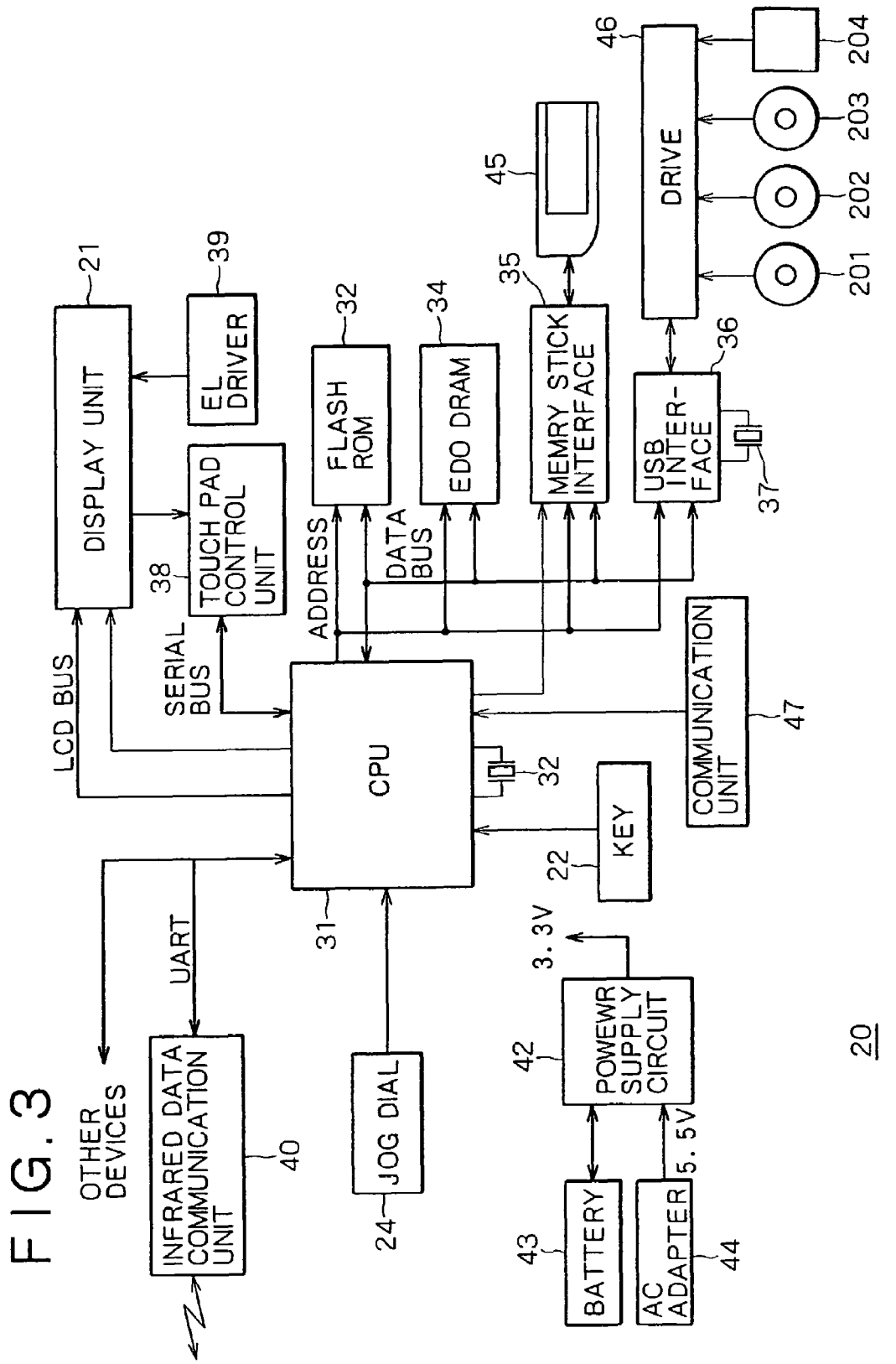
FIG. 3 is a schematic block diagram outlining an internal structure of the PDA.

FIG. 3 is a schematic block diagram of the PDA 20. A CPU (central processing unit) 31 in FIG. 3 operating in synchronism with a clock signal from an oscillator 32 executes various programs including display programs held in a flash ROM (read-only memory) 33 or an EDO DRAM (extended data-out dynamic random-access memory) 34. The flash ROM 33 is a flash memory that is a variation of the EEPROM (electrically erasable programmable read-only memory). As such, the flash ROM 33 generally accommodates programs and basically fixed data in arithmetic parameters for use by the CPU 31. The EDO DRAM 34 stores programs used by the CPU 31 in execution as well as parameters that may vary during such execution.

A Memory Stick interface 35 serves to read data from a Memory Stick (registered trademark) 45 inserted in the PDA 20 and to write data coming from the CPU 31 to the Memory Stick 45.

A USB (Universal Serial Bus) interface 36 receives data or programs from a connected drive 46 (a USB device) in synchronism with a clock signal from an oscillator 37, and supplies data coming from the CPU 31 to the drive 46. The drive 46 having a magnetic disc 201, an optical disc 202, a magneto-optical disc 203 or a semiconductor memory 204 loaded therein reads data or programs from the loaded storage medium, and supplies the retrieved data or programs to the configured CPU 31 or EDO DRAM 34 via the USB interface 36.

The flash ROM 33, EDO DRAM 34, Memory Stick interface 35, and USB interface 36 are connected to the CPU 31 through an address bus and a data bus.

The display unit 21 receives data from the CPU 31 over an LCD bus and displays images or text corresponding to the received data. When the touch pad on top of the display unit 21 is operated, a touch pad control unit 38 receives from the display unit 21 data corresponding to the touching operations, and sends signals representing the data to the CPU 31 over the serial bus.

An EL (electroluminescence) driver 39 drives EL elements at the back of the liquid crystal display in the display unit 21, thereby controlling the brightness of display on the display unit 21.

An infrared data communication unit 40 receives data from the CPU 31 via a UART (universal asynchronous receiver-transmitter) and sends the received data by infrared rays to other devices, not shown. The communication unit 40 also receives data by infrared rays from other devices and forwards the received data to the CPU 31. The PDA 20 may communicate with other devices through the UART.

A communication unit 47 connected illustratively to the Internet 5 receives data (such as e-mails) from the CPU 31, puts the received data into packets according to a predetermined method, and sends the packets to a desired destination over the Internet 5. Furthermore, the communication unit 47 receives data (e.g., e-mails) or programs in packets from other parties over the Internet 5, and forwards the received data or programs to the CPU 31.

A power supply circuit 42 converts the voltage of power from an attached battery 43 or from a connected AC (alternating current) adapter 44, and supplies the power thus converted to the components ranging from the CPU 31 to the communication unit 47.

Figure 4:
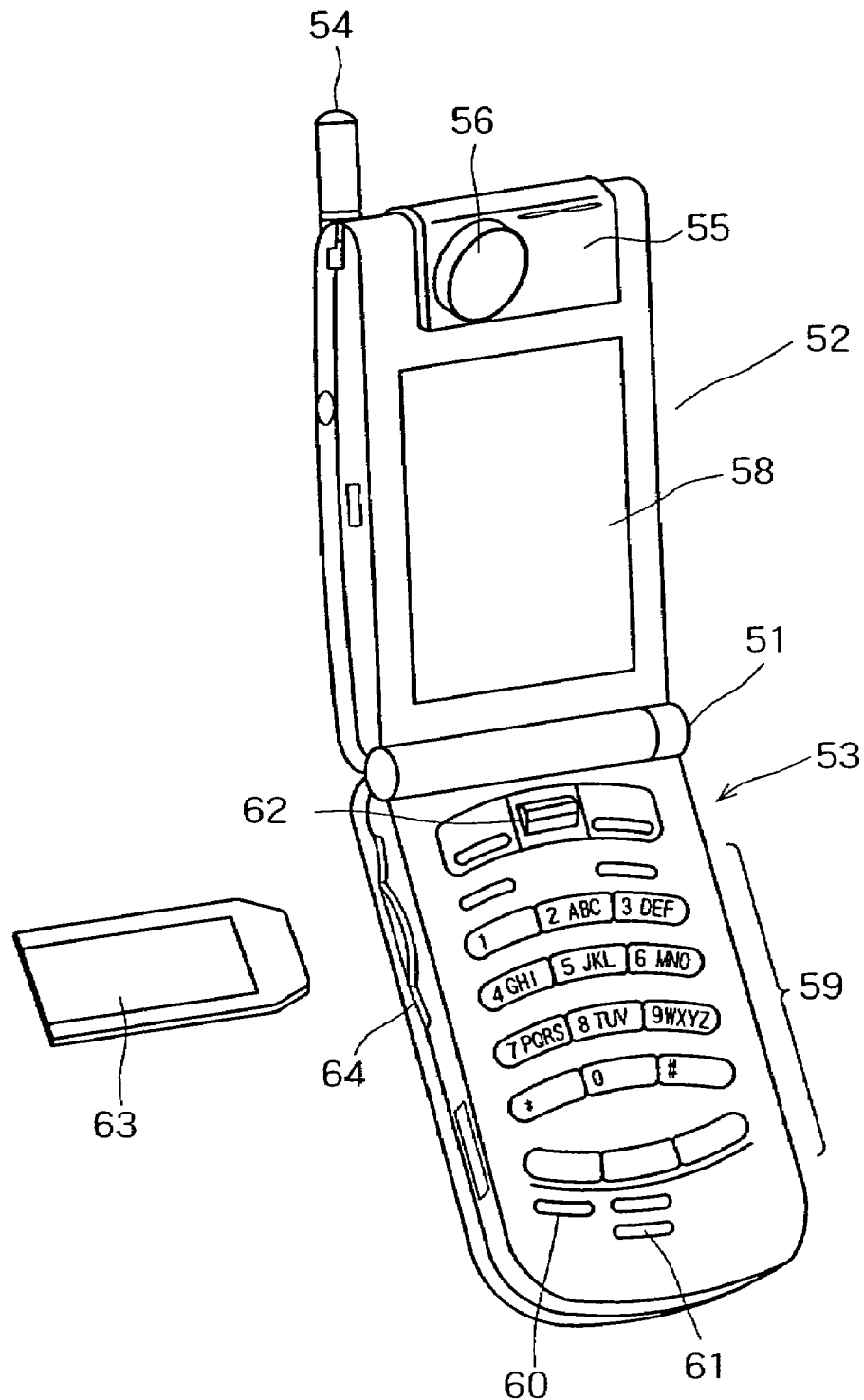
FIG. 4 is an external view of a camera-equipped portable telephone.

The portable data terminals 1-3 and 1-4 are each a so-called portable telephone whose external view is shown in FIG. 4. The portable telephones 1-3 and 1-4 are each equipped with a camera for taking pictures. In the description that follows, the camera-equipped digital portable telephones 1-3 and 1-4 will be referred to generically as the camera-equipped digital portable telephone 50. As illustrated in FIG. 4, the camera-equipped digital portable telephone 50 is made up of a display unit 52 and a body 53. The display unit 52 folds onto the body 53 around a hinge portion 51 in the middle of the device.

The display unit 52 has a retractable transceiver antenna 54 furnished at its top left position. Using the antenna 54, the camera-equipped digital portable telephone 50 sends and receives radio waves to and from any one of the base stations 2. The display unit 52 has a camera unit 55 mounted on its top edge at the center. From its initial position, the camera unit 55 may be rotated over a range of about 180 degrees. The user of the portable telephone 50 may take pictures of a desired object by means of a CCD camera 56 in the camera unit 55.

Figure 5:
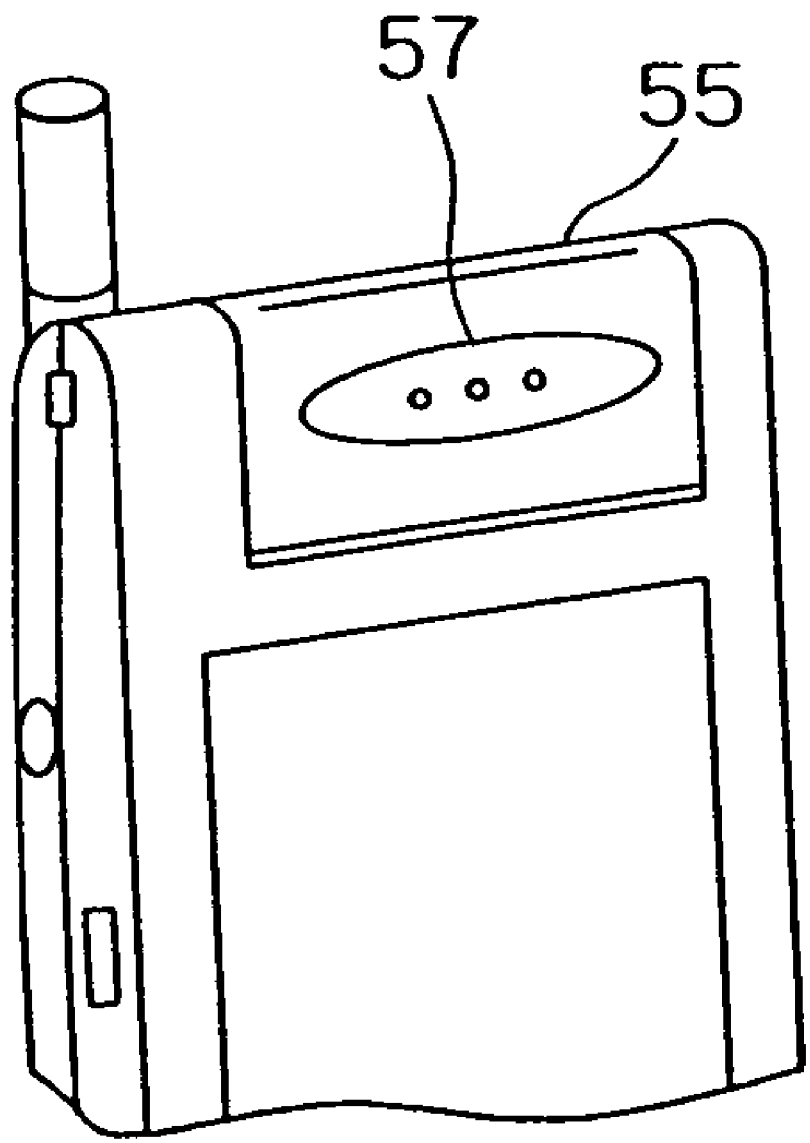
FIG. 5 is a partial external view of the camera-equipped digital portable telephone showing how a camera unit is rotated on a display unit.

When the user rotates the camera unit 55 by about 180 degrees from its initial position, the display unit 55 is positioned in such a manner that a speaker 57 in the rear middle of the camera unit 55 faces the front, as shown in FIG. 5. When set in that state, the camera-equipped digital portable telephone 50 operates in regular voice call mode.

A liquid crystal display 58 is furnished at the front of the display unit 52. The LCD 58 displays such indications as radio wave reception status, the remaining battery level, names of parties to be called and their telephone numbers in telephone directories, and call histories, as well as e-mail contents, simple-format website contents, and images picked up by the CCD camera 56 of the camera unit 55.

The body 53 has numeric keys "0" through "9" and operation keys 59 including an off-hook key, a redial key, an on-hook/power key, a clear key, and an e-mail key. Various commands reflecting manipulations of the operation keys 59 are input to the camera-equipped digital portable telephone 50. Under the operation keys 59 on the body 53 are a memo button 60 and a microphone 61. Operating the memo button 60 during a phone call causes the portable telephone 50 to record the other party's voice. The microphone 61 picks up the voice of the user holding the portable telephone 50 during a phone call.

A rotatable jog dial 62 is provided above the operation keys 59 on the body 53, the dial top slightly projecting from the body surface. Rotating the jog dial 62 allows the user to scroll a telephone directory list or an e-mail list, change pages of simple-format website contents, or move images forward and backward on the screen of the liquid crystal display 58.

Illustratively, the body 53 displays a plurality of telephone numbers for selection from a telephone directory list on the liquid crystal display 58 in response to the rotating manipulations of the jog dial 62 by the user. When the user pushes the jog dial 62 down into the body 53, the currently selected number on the screen is finalized and a call is placed to that number automatically.

The body 53 has a battery pack furnished on its back, not shown. When the on-hook/power key is switched on, the battery pack powers up the internal circuits and brings the telephone into an active state.

The top left-hand side of the body 53 has a Memory Stick slot 64 into which a detachable Memory Stick (trademark of Sony Corporation) 63 may be inserted. Pushing the memo button 60 during a phone call causes the portable telephone 50 to record the other party's voice to the loaded Memory Stick 63. The portable telephone 50 may also record e-mail texts, simple-format website contents, or images picked up by the CCD camera 56 to the inserted Memory Stick 63 in response to the user's suitable operations.

The Memory Stick 63 is a flash memory card developed by Sony Corporation, applicant of this invention. The Memory Stick 63 is one variation of EEPROM, i.e., an electrically writable and erasable nonvolatile memory constituted by flash memory elements housed in a small, thin plastic case measuring 21.5 mm by 50 mm by 2.8 mm. Through a 10-pin terminal, the memory device allows diverse data such as image, voice and music data to be written thereto and read therefrom.

The Memory Stick 63 adopts a proprietary serial protocol ensuring compatibility with different devices that are subject to specification changes caused illustratively by capacity enhancements in their built-in flash memories. Under its protocol, the memory provides write speeds of up to 1.5 MB/S and read speeds of up to 2.45 MB/S. A write protect switch furnished to the Memory Stick 63 affords a high degree of data security.

The camera-equipped digital portable telephone 50, designed to accommodate the above-described Memory Stick 63, can share data with other electronic devices using this memory as an intermediary.

Figure 6:
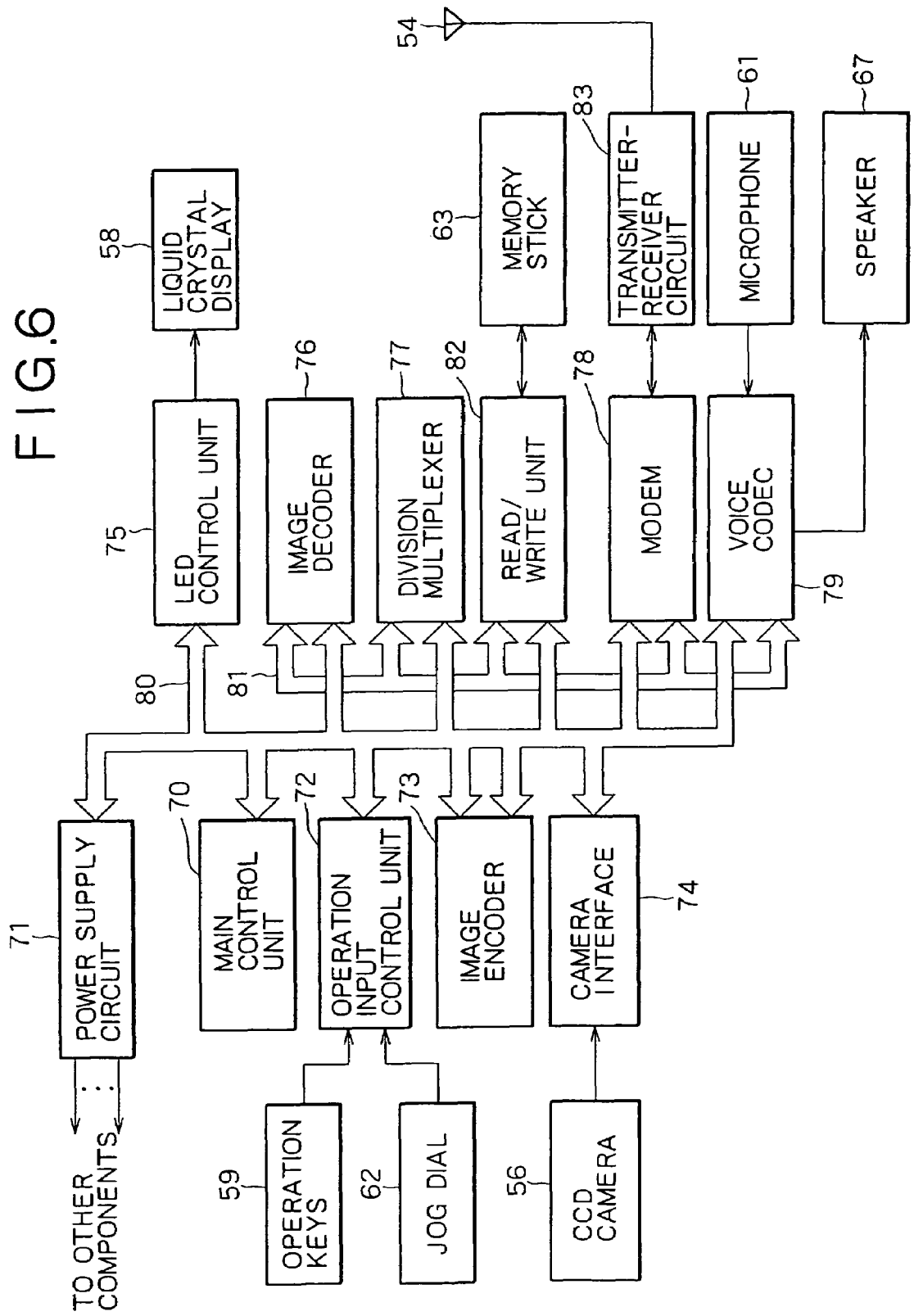
FIG. 6 is a schematic block diagram outlining an internal structure of the camera-equipped digital portable telephone.

As shown in FIG. 6, the camera-equipped digital portable telephone 50 has a main control unit 70 that provides overall control on the components of the display unit 52 and body 53. The main control unit 70 is connected via a main bus 80 to a power supply circuit 71, an operation input control unit 72, an image encoder 73, a camera interface 74, an LCD (liquid crystal display) control unit 75, an image decoder 76, a division multiplexer 77, a read/write unit 82, a modem 78, and a voice codec 79. The image encoder 73, image decoder 76, division multiplexer 77, modem 78, and voice codec 79 are interconnected through a synchronous bus 81.

When the user turns on the on-hook/power key, the power supply circuit 71 causes the battery pack to power the components and thereby brings the camera-equipped digital portable telephone 50 into an operable state.

Under control of the main control unit 70 including a CPU, a ROM and a RAM, the camera-equipped digital portable telephone 50 causes the voice codec 79 to convert voice signals picked up by the microphone 61 in voice call mode into digital voice data. The portable telephone 50 then subjects the digital voice data to spread-spectrum encoding by the modem 78. A transmitter-receiver circuit 83 subjects the encoded data to a digital-analog conversion process and a frequency conversion process before transmitting the converted data via the antenna 54.

In voice call mode, the camera-equipped digital portable telephone 50 amplifies signals received via the antenna 54 and subjects the received signals to frequency conversion and analog-digital conversion. The converted signals are subjected to spread-spectrum decoding by the modem 78 before being converted to analog voice signals by the voice codec 79. The portable telephone 50 causes the speaker 57 to effect an audio output representative of the analog voice signals.

In data communication mode, the camera-equipped digital portable telephone 50 transmits an e-mail as follows: the user enters a mail text by manipulating the operation keys 59 and jog dial 62. The input text data are forwarded to the main control unit 70 through the operation input control unit 72.

The main control unit 70 puts the text data to spread-spectrum encoding by the modem 78 and subjects the encoded data to digital-analog conversion and frequency conversion by the transmitter-receiver circuit 83. The data thus converted are transmitted to the base station 2 (FIG. 1) via the antenna 54.

Also in data communication mode, the camera-equipped digital portable telephone 50 receives an e-mail as follows: signals received from the base station 2 via the antenna 54 are subjected to spread-spectrum decoding by the modem 78 whereby the original text data are restored. The text is then displayed as an e-mail content on the liquid crystal display 58 under control of the LCD control unit 75. With the e-mail received and displayed, the camera-equipped digital portable telephone 50 may record the received mail to the Memory Stick 63 through the read/write unit 82 in response to the user's appropriate operations.

When transmitting image data picked up by the CCD camera 56 in data communication mode, the camera-equipped digital portable telephone 50 feeds the data to the image encoder 73 through the camera interface 74.

When not transmitting image data captured by the CCD camera 56, the camera-equipped digital portable telephone 50 may cause the data to be displayed directly on the liquid crystal display 58 via the camera interface 74 and LCD control unit 75.

Given image data from the CCD camera 56, the image encoder 73 subjects the data to compression coding based on MPEG (Moving Picture Experts Group) 2, MPEG4 or other suitable coding standards. The coded image data thus obtained are sent to the division multiplexer 77. At the same time, the camera-equipped digital portable telephone 50 feeds the division multiplexer 77 with digital voice data representative of the voice captured by the microphone 61 during image pickup by the CCD camera 56. The captured voice is coded beforehand into the digital voice data by the voice codec 79.

The division multiplexer 77 multiplexes the coded image data from the image encoder 73 and the voice data from the voice codec 79 by a predetermined method, subjects the data thus multiplexed to spread-spectrum encoding by the modem 78, submits the encoded data to digital-analog conversion and frequency conversion by the transmitter-receiver circuit 83, and transmits the data thus converted from the antenna 54.

When receiving moving image file data from, say, a linked simple-format website in data communication mode, the camera-equipped digital portable telephone 50 first receives signals from the base station 2 via the antenna 54. The received signals are subjected to spread-spectrum decoding by the modem 78. The multiplexed data derived from the decoding are forwarded to the division multiplexer 77.

The division multiplexer 77 divides the received multiplexed data into coded image data and voice data. The coded image data are fed to the image decoder 76 and the voice data to the voice codec 79 through the synchronous bus 81.

The image decoder 76 decodes the coded image data received so as to generate playback-ready moving image data using a decoding method compatible with the coding standard in effect such as MPEG2 or MPEG4. The moving image data thus decoded are supplied to the liquid crystal display 58 through the LCD control unit 75. These steps allow the camera-equipped digital portable telephone 50 to display image data derived illustratively from a moving image file coming from a linked simple-format website.

In the process above, the voice codec 79 converts the voice data involved into analog voice signals that are supplied to the speaker 57 for audio output. This allows the portable telephone 50 illustratively to play back the voice data contained in the moving image file from the linked simple-format website.

As in the case of e-mail, the user may suitably operate the camera-equipped digital portable telephone 50 to write to the Memory Stick 63 the received data from linked simple-format websites or the like by way of the read/write unit 82.

Below is a description of how maps are referenced by use of the PDA 20. The data that provide maps on the display unit 21 (FIG. 3) of the PDA 20 are stored in the Memory Stick 45. Instead of being stored in and retrieved from the Memory Stick 45, the map data may alternatively be acquired over the public switched network 3 or the Internet 5. The PDA 20 may be replaced by the portable data terminal 1 or by a personal computer (not shown) in carrying out the operations to be described below.

Figure 7:
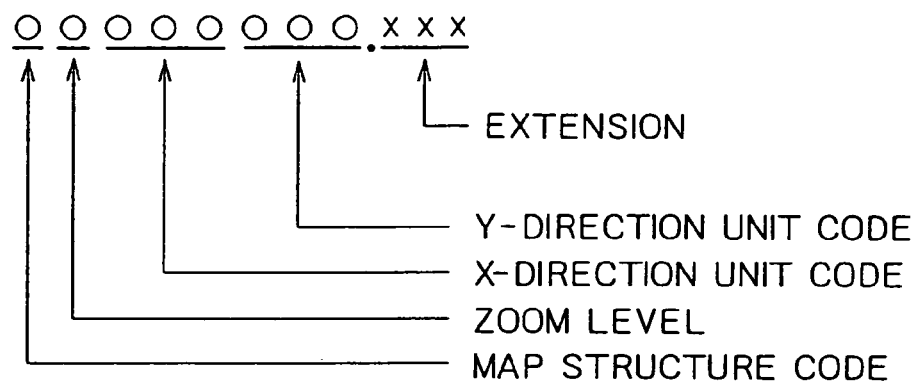
FIG. 7 is a schematic view explaining a map file name.

The Memory Stick 45 accommodates map data therein and has the stored data managed by use of map file names such as one shown in FIG. 7. A map file name is made up of an eight-byte file name and a three-byte extension. The extension denotes a compression method by which map data are stored in the file in question. There are such extensions as JPG (Joint Photograph Experts Group), PNG (Portable Network Graphics) and SVG (Scalable Vector Graphics) representative of the respective compression standards.

Figure 8:
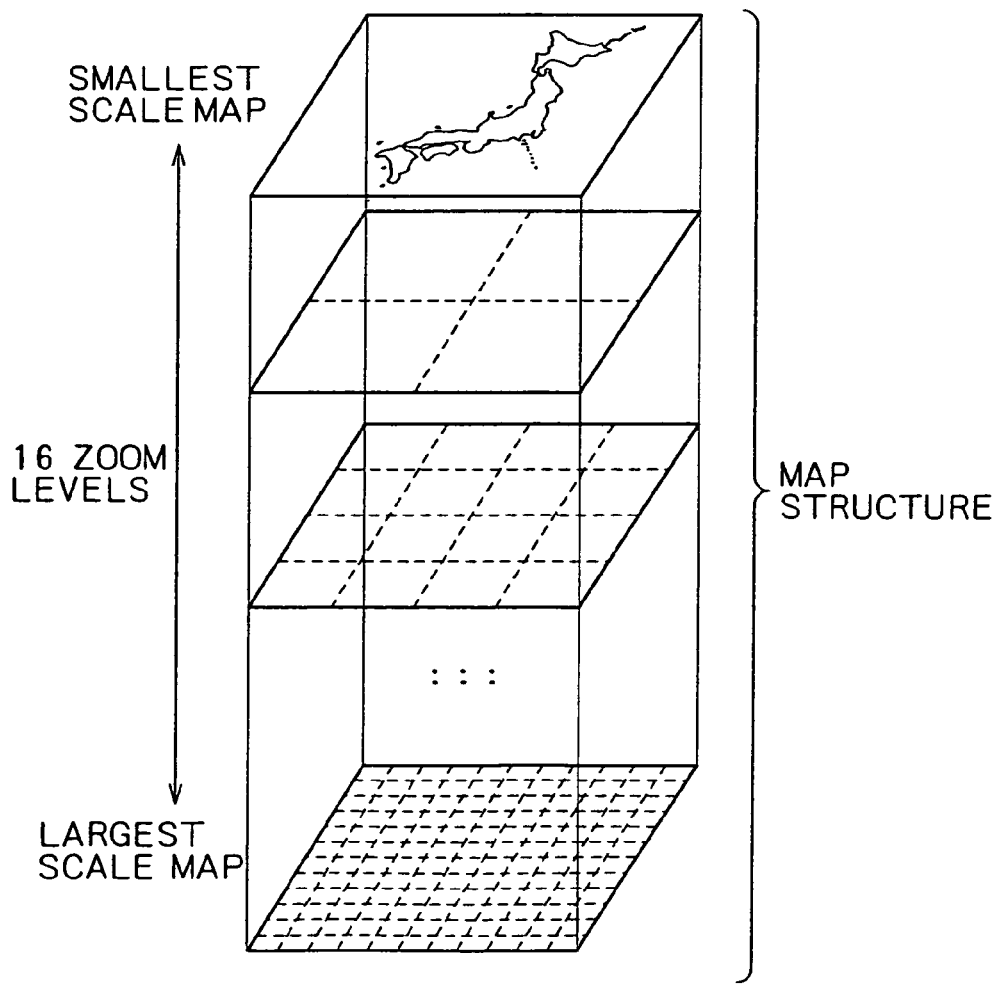
FIG. 8 is a schematic view depicting a map structure.

The first character (leftmost character) in the eight-byte map file name represents a map structure code using one of the alphabetic characters A through Z. One map structure illustratively has 16 zoom levels ranging from the largest scale to the smallest, as shown in FIG. 8. Each scale is represented by a zoom level using a single character in the second character position of the eight-byte map file name. The smallest scale is denoted by character "F" and the largest by "0" in hexadecimal notation. Divided map blocks on the same scale are of the same size each. One of two maps on any two adjacent scales is twice as large or as small as the other map per area side. The smallest scale serving as the reference to all divided map blocks on the larger scales is not limited by any specific rules; any rectangular map may be employed for the reference scale.

Consider a map structure that contains map data on the Japanese Archipelago as shown in FIG. 8. This structure is capable of expressing maps ranging from the smallest scale to the largest, e.g., from a wide area map of 2,560 km square covering Japan as a whole, to a divided map block as small as 78 meters square.

Figure 9:
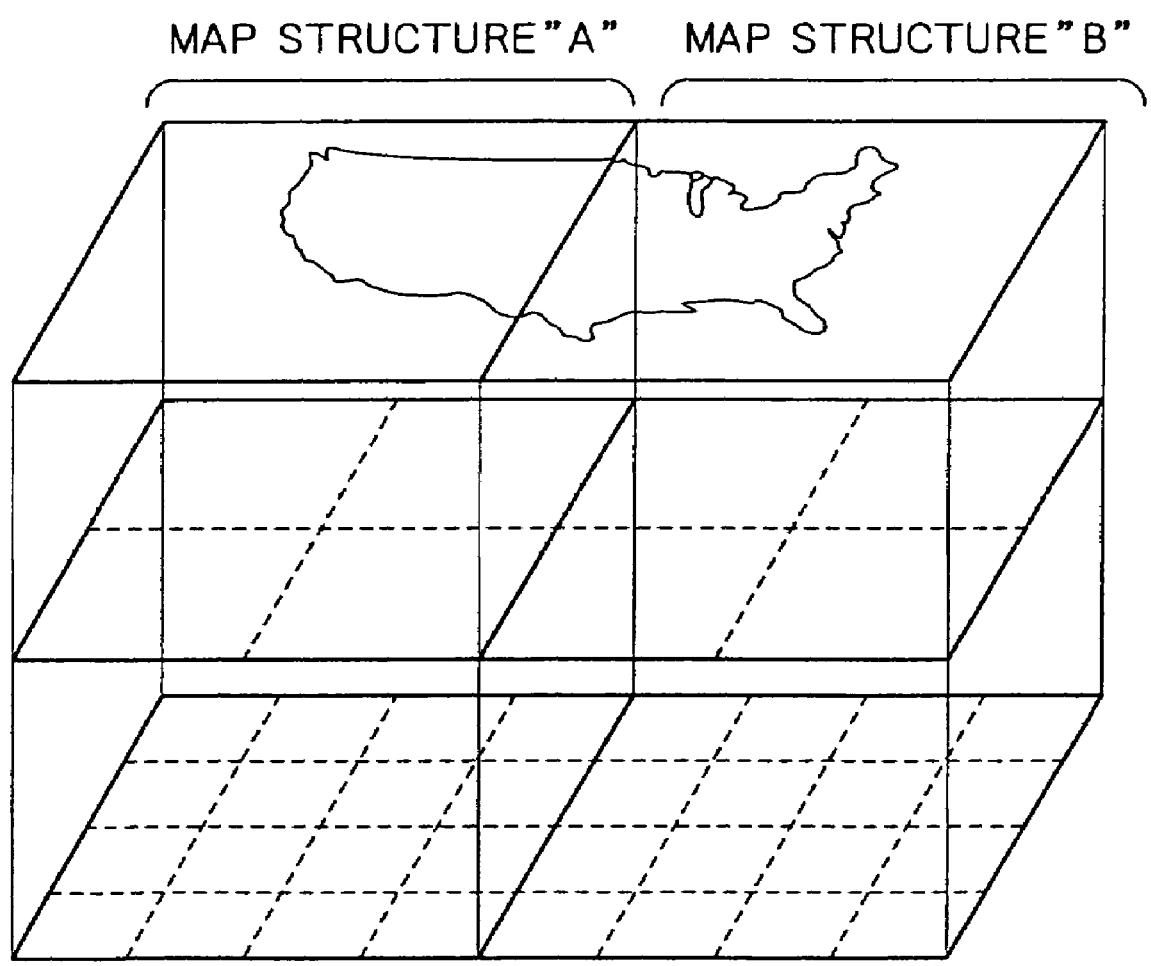
FIG. 9 is another schematic view illustrating map structures.
Figure 10:
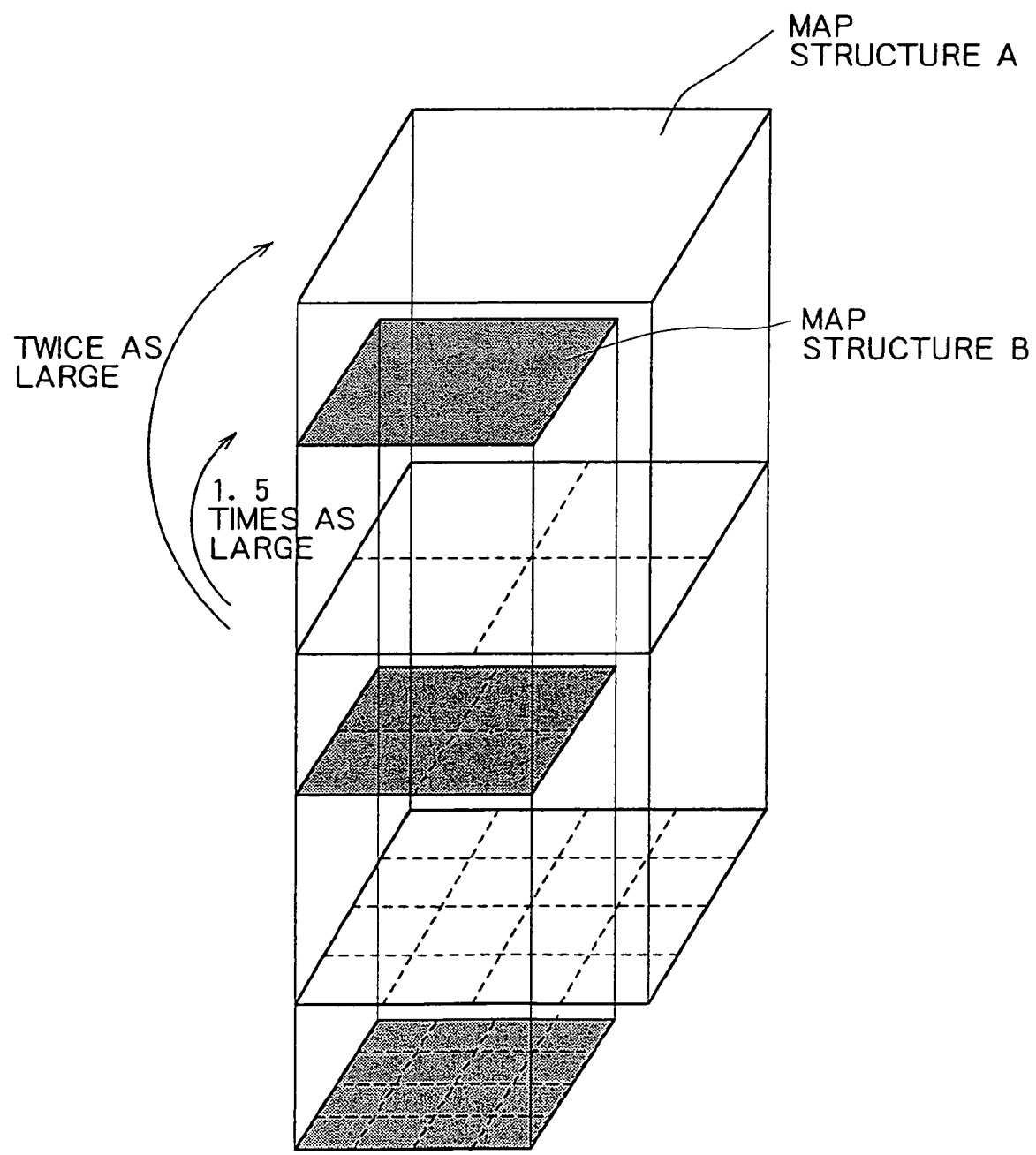
FIG. 10 is a schematic view showing how maps are zoomed in and out.

If the target land is as extensive as, say, the United States and if the largest scale map area is set for as small as 78 meters square, it will be impossible for a single map structure to accommodate the whole territory even on the smallest scale. In such a case, as shown in FIG. 9, a plurality of map structures (two structures in the example of FIG. 9) may be established side by side to encompass the vast country while sticking to the same largest scale.

Where it is determined that one of two maps on any two adjacent scales is twice as large or as small as the other map per area side, a zoom-in or a zoom-out operation from a given map brings up a map twice as large or as small as the current map per side on the next larger or smaller scale. If, as shown in FIG. 10, a plurality of map structures (structures A and B in FIG. 10) are nested across vertical relationships of their scales, it is possible to perform a zoom-in or a zoom-out operation to call up maps 1.5 times as large or as small as the current map per side on the next larger or smaller scale.

With a map on display, moving the cursor to any one of its edges generally scrolls the page to the adjacent map (i.e., through page feed). In that case, if there is no overlapping portion between the two pages, the continuity of maps can be lost and users can often lose track of where they are at that point on the map.

Figure 11:
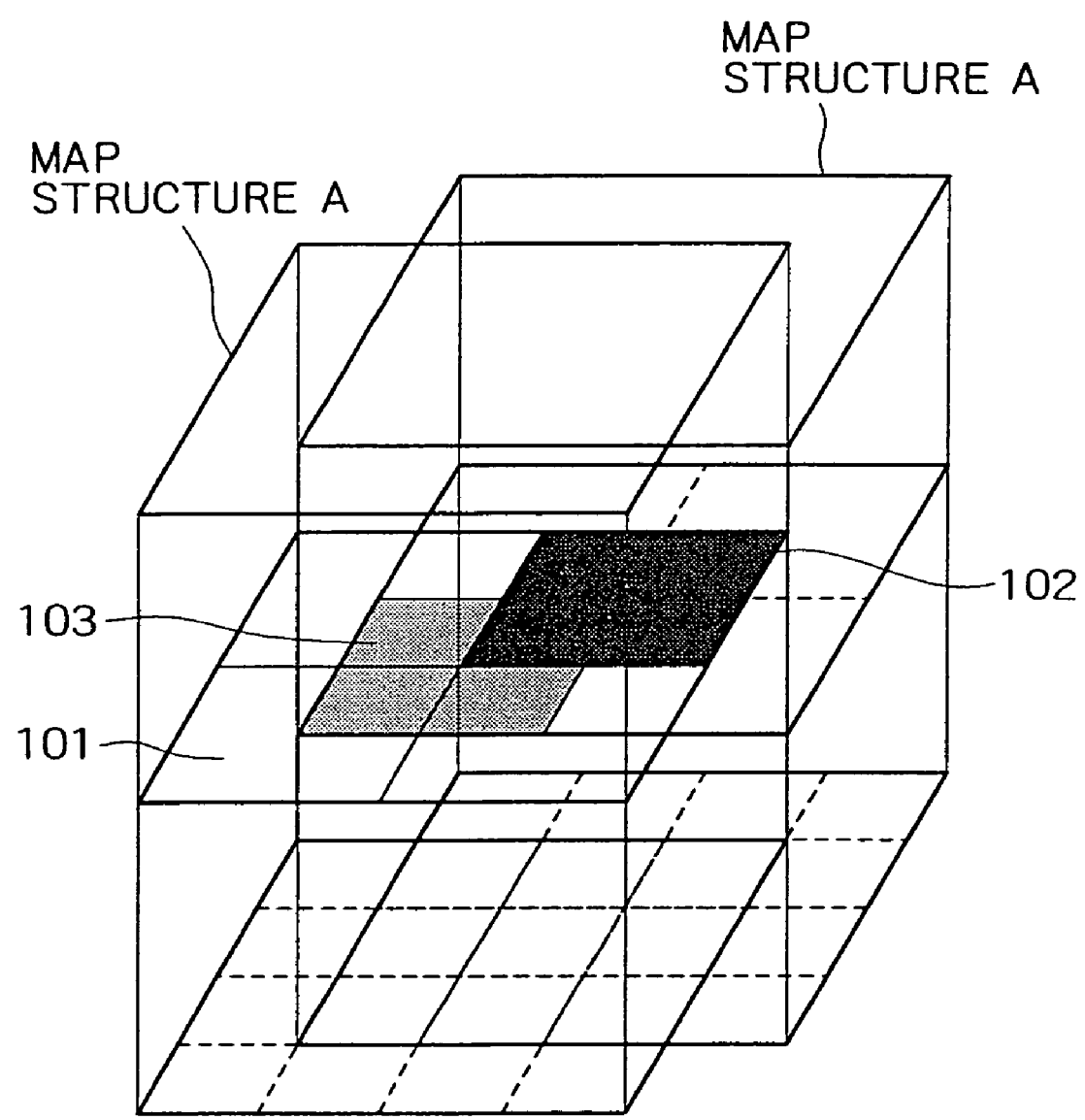
FIG. 11 is a schematic view indicating how maps are scrolled.

That eventuality is circumvented by the multiple map structure scheme in a manner shown in FIG. 11 (map structures A and B in FIG. 11). That is, the individual map structures are slightly staggered with one another so that when the user wants to move from map data 101 in the map structure A to map data 103 in the same structure, the movement takes place not directly therebetween but by way of map data 102 in the map structure B. With an overlapping map portion thus displayed in transition, the continuity of map data is ensured.

Returning to the description of the map file name with reference to FIG. 7, the map structure code in the first byte position serves to identify the map structure described above (i.e., a code for extracting a desired map structure).

The third through the fifth byte positions in the eight-byte map file name represent an X-direction unit code, and the sixth through the eighth byte position denote a Y-direction unit code. The unit codes, each expressed in a three-digit number with a radix of 32, indicate where the map data in question are located on the same zoom level. FIG. 12 shows a numeral system with the radix of 32.

Figure 14:
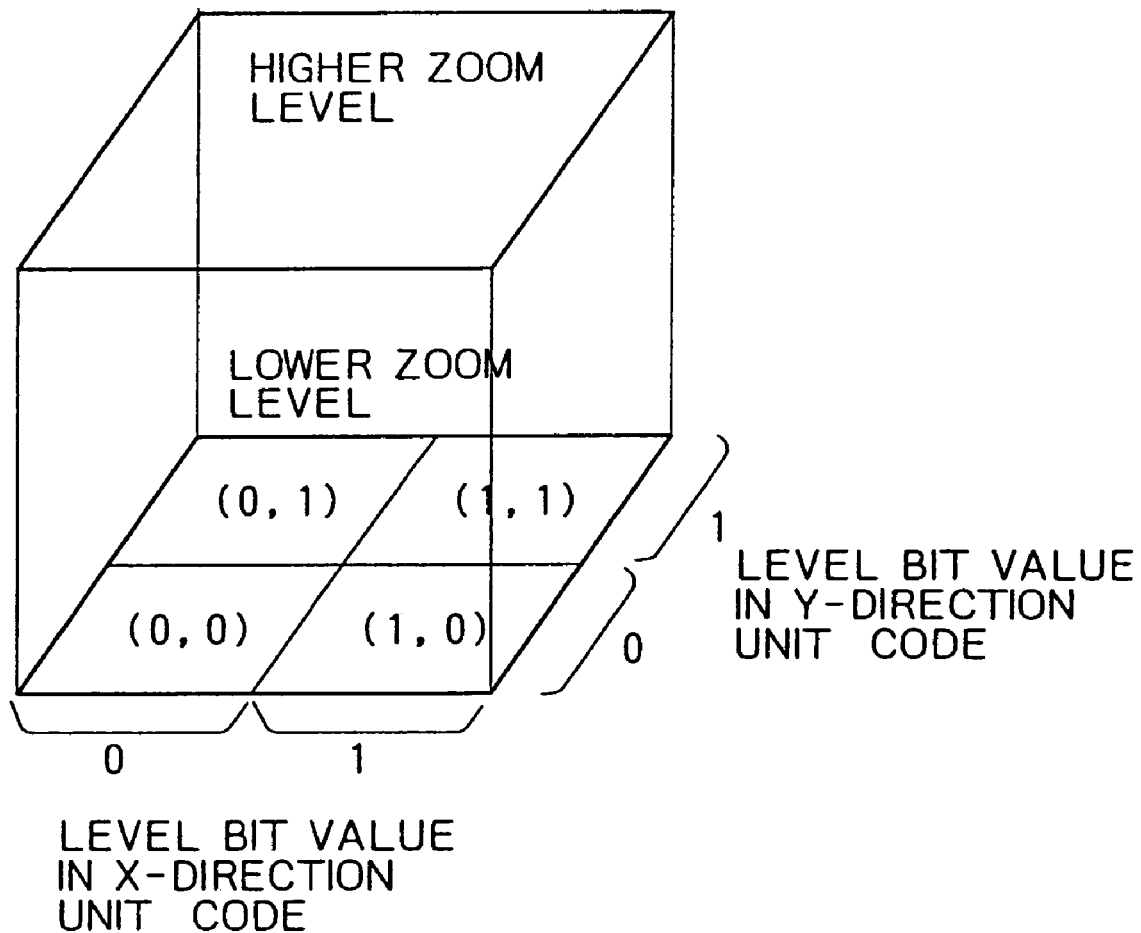
FIG. 14 is a schematic view explaining zoom level bits.

The unit codes each have a level bit associated with a zoom level (i.e., a value in the second byte position of the map file name). The bit level values in the map file names determine the vertical relationship of the corresponding maps. When the zoom level is "F," the X- and Y-direction unit codes are "000" each. As shown in FIG. 14, each map has four divided map blocks on the next lower zoom level. The four map blocks are expressed by coordinates (0, 0), (1, 0), (0, 1) and (1, 1) in the X and Y directions. The bits thus assigned constitute the level bits corresponding to the zoom levels.

A typical map file name will now be described with reference to FIG. 15. If the map file name on a given zoom level is "A6L60CI0," that means the X- and Y-direction unit codes are "L60" and "CI0," respectively, which are expressed as "10101 00110 00000" and "01100 10010 00000" in binary notation. The next lower zoom level of the map file name "A6L60CI0" is "5," of which the corresponding level bit is "6" according to FIG. 13. That is, the changed bit on the next lower zoom level is in the sixth bit position.

Figure 15:
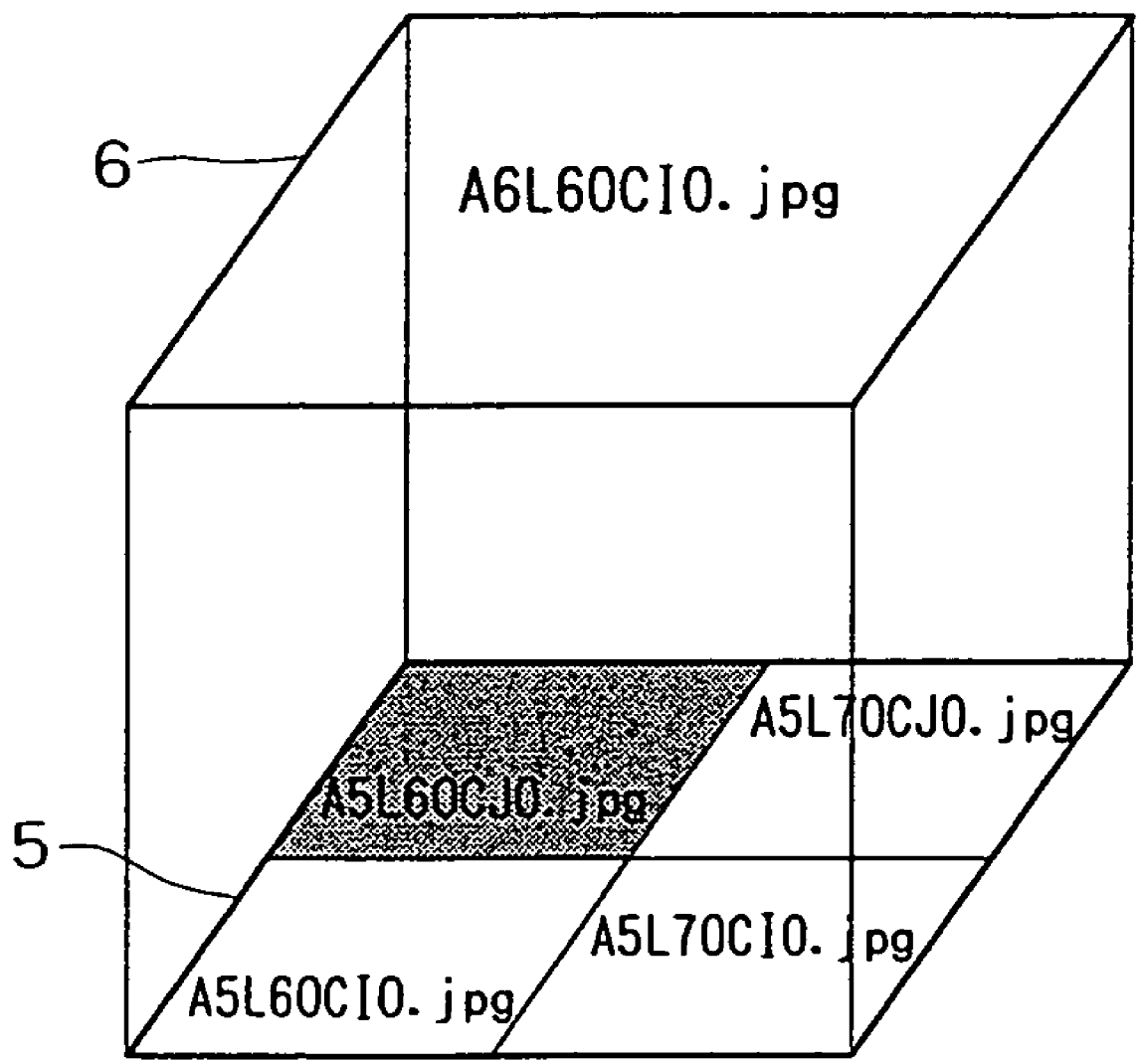
FIG. 15 is another schematic view explaining zoom level bits.

The unit codes of the shaded map in FIG. 15 are acquired as follows: the level bit change given as (0, 1) translates into "10101 00110 00000"="L60" and "01100 10011 00000"="CJ0." That is, the map file name is given as "5L60CJ0."

As described, by using three-digit X- and Y-direction unit codes in numbers with the radix 32, it is possible to express the positions of maps making up a single map structure.

The map data file having a map file name defined as described above contains header information shown in FIG. 16 in addition to map image data. The header information is made up of the following items: a geodetic system used to conduct surveys upon map making; a map X-direction dot count and a map Y-direction dot count for designating the size in which the map in question is drawn; a map X-direction center real distance and a map Y-direction center real distance used to express the scale of the map; the orientation of the map; and latitudes and longitudes of four corners of the map area, used to draw the map in terms of geographic coordinates. The orientation of the map and the four corners of the map in latitudes and longitudes are used to store the data of a map whose top is not oriented toward the north.

Below is a description of how the PDA 20 typically displays maps based on map data files that are stored in the Memory Stick 45 in the manner outlined above. By retrieving any one map data file, the PDA 20 can acquire the area size of the smallest scale map and coordinates of its right and left edges in latitudes and longitudes, obtain map data containing a desired latitude and longitude, perform zoom-in and zoom-out operations of maps, and scroll map data. In the description that follows, the top of the map is assumed to be oriented toward the north.

Figure 18:
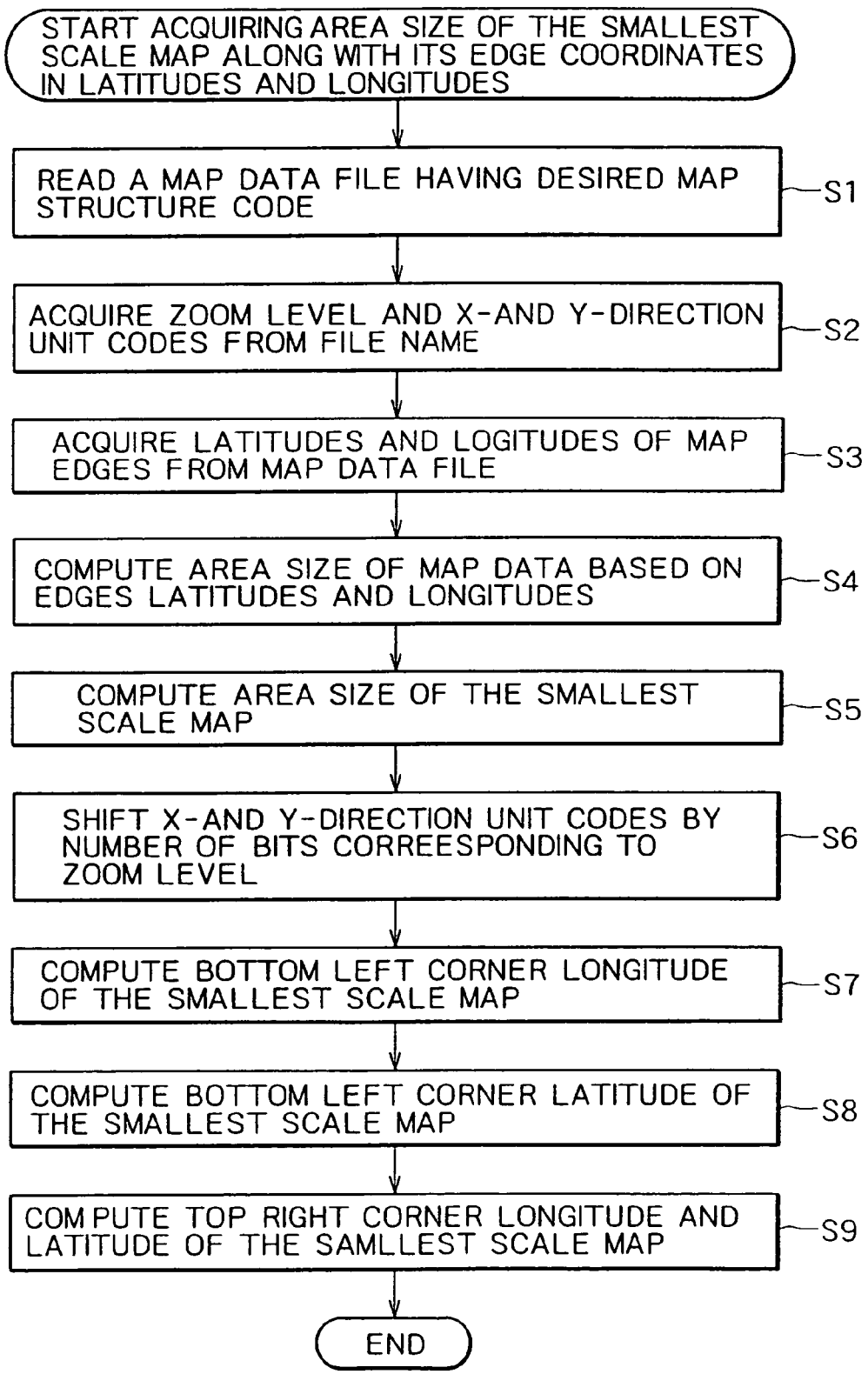
FIG. 18 is a flowchart of steps for acquiring latitude and longitude information.

Described below with reference to the flowchart of FIG. 18 is how the PDA 20 acquires the area size of the smallest scale map along with its right and left edge coordinates in latitudes and longitudes. In step S1 of FIG. 18, a map data file having a desired map structure code is read from the Memory Stick 45. In step S2, a zoom level, an X-direction unit code and a Y-direction unit code are obtained from the eight-byte map file name thus read.

If the eight-byte map file name read in step S1 is, say, "A7L80C40," then the zoom level is "7" and the X- and Y-direction unit codes are "L80" and "C40" respectively.

In step S3, the latitudes and longitudes of the right and left edges are acquired from the retrieved map file name. In step S4, the area size of the map data is computed on the basis of the latitudes and longitudes of the two map edges thus obtained.

Suppose that following data acquisition from the map data file named "A7C80C40," the bottom left corner of the map is found to be located at Long. 139°37'30"E(W) and Lat. 35°35'00"N(S) and that the top right corner is at Long. 139°45'00"E(W) and Lat. 35°40'00"N(S). In that case, the area size of the retrieved map data is obtained by computing differences in absolute values between the latitudes as well as between the longitudes. The area size is thus given as spanning 7 minutes, 30 seconds in longitudes (i.e., absolute value resulting from 139°37'30"-139°45'00") and 5 minutes, 00 second in latitudes (absolute value from 35°35'00"-35°40'00").

In step S5, the area size of the smallest scale map is computed by having the area size of the retrieved map data multiplied by 2 raised to the power of 15 minus the current zoom level. The number 15 represents the zoom level of the smallest scale, and the current zoom level is that which was obtained in step S2. Because the current zoom level is 7 in this example, the area size of the smallest scale map is computed as follows: $(7'30'', 5'00'') \times 2^{(15-7)} = (32°00', 21°20')$.

After the area size of the smallest scale map is computed in step S5, step S6 is reached. In step S6, the X- and Y-direction unit codes are shifted right by the number of bits corresponding to the zoom level. In this example, the zoom level is 7 and thus $(L80)_{32}$ and $(C40)_{32}$ are shifted right by 7 bits to become $(5A)_{32} = 170$ and $(31)_{32} = 97$ respectively. Parenthesized numerals with a subscript of 32 each stand for numbers with the radix 32.

In step S7, the longitude of the bottom left corner of the smallest scale map is computed. The computation involves subtracting, from the leftmost longitude of the map data acquired in step S3, the area size computed in step S4 and multiplied by the X-direction unit code shifted right by the number corresponding to the zoom level in step S6. In this example, the bottom left corner is found to be located at Long. 117°22'30"E(W) (=139°37'30"-7'30"×170).

In step S8, the latitude of the bottom left corner of the smallest scale map is computed. As with the computation in step S7, step S8 involves subtracting, from the leftmost latitude of the map data acquired in step S3, the area size computed in step S4 and multiplied by the Y-direction unit code shifted right by the number corresponding to the zoom level in step S6. In this example, the bottom left corner is found to be located at Lat. 27°30'00"N(S) (=35°35'00-5'00").

In step S9, the longitude and latitude of the top right corner of the smallest scale map are computed. The top right corner longitude and latitude of the smallest scale map are obtained by adding the area size of the smallest scale map to the bottom left corner longitude and latitude acquired in steps S7 and S8. In this example, the top right corner is found to be located at Long. 149°22'30"E(W) and Lat. 48°50'00"N(S) (=117°22'30", 27°30'00")+(32°00'00", 21°20'00").

The steps above show that even if the map data file of the smallest scale does not exist, the currently available data may be handled as the smallest scale map in a virtual manner. That is, where not all map data files exist in a given map structure, the retrieval of a map data file of a necessary region alone can provide information sufficient for map display.

Figure 19:
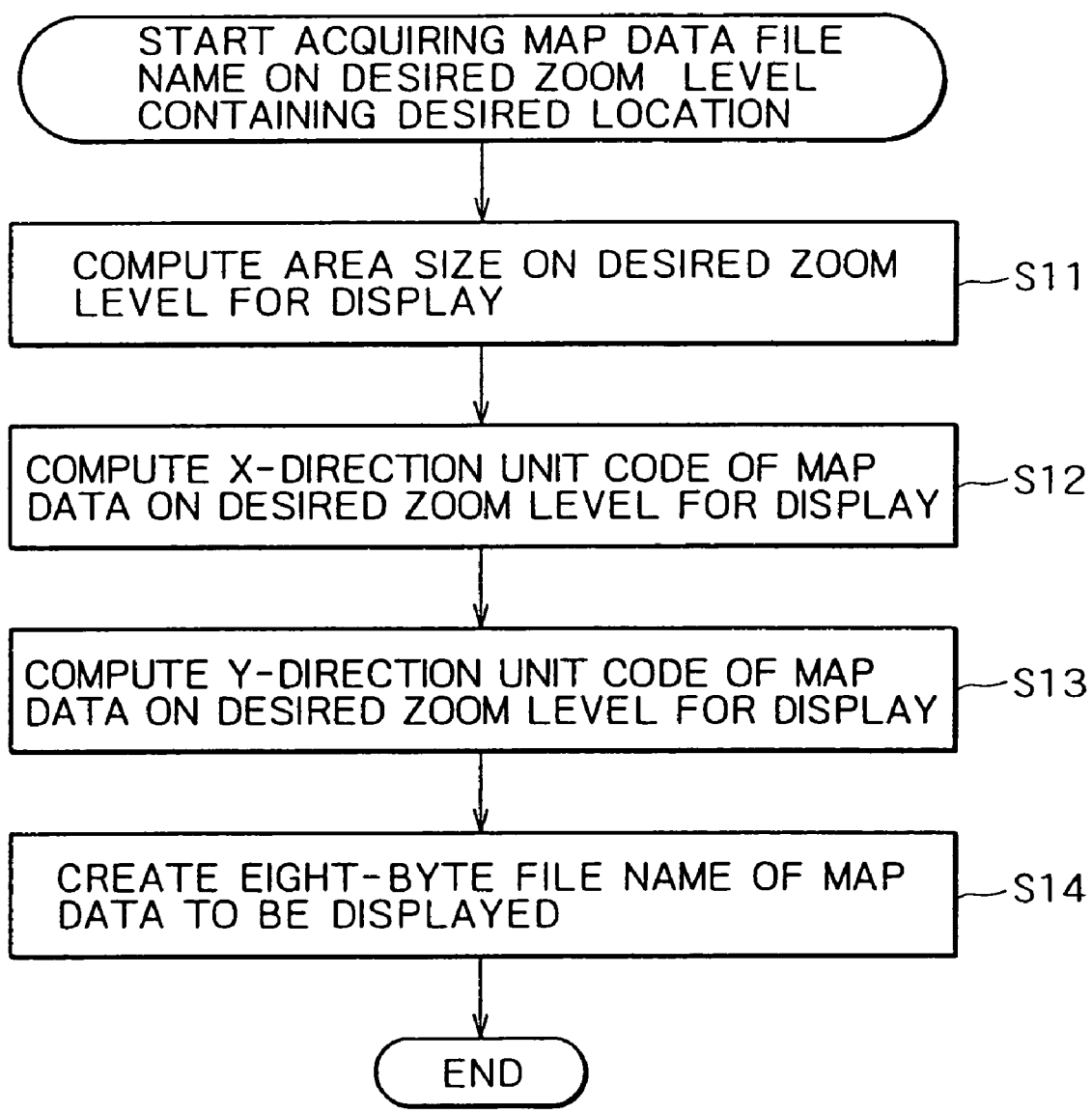
FIG. 19 is a flowchart of steps for acquiring a map data file.

Described below with reference to the flowchart of FIG. 19 is how to acquire a map data file name of a desired zoom level containing a desired location based on the area size of the smallest scale map and on its bottom left corner longitude and latitude. For purpose of illustration, it is assumed that the area size of the smallest scale map spans 32°00' in longitudes and 21°20'00" in latitudes; that the bottom left corner of the map is located at Long. 119°00'00"E(W) and Lat. 20°40'00"N(S); that a desired location is situated at Long. 139°44'50"E(W) and Lat. 35°37'37"N(S); and that the zoom level for display is 7.

In step S11 of FIG. 19, the area size of the desired zoom level for display is computed. The computation involves having the area size of the smallest scale map divided by 2 raised to the power of 15 minus the desired zoom level for display. In this example, the area size of the smallest scale map is computed as follows: $(32°00', 21°20')/2^{(15-7)} = (7'30", 5'00")$.

In step S12, the X-direction unit code of the map data on the desired zoom level for display is computed. The computation is performed as follows: subtract the bottom left corner longitude of the smallest scale map from the longitude of the desired location, divide the difference from the subtraction by the area size of the desired zoom level for display, and shift left the integer part of the quotient from the division by the number of bits corresponding to the desired zoom level. In this example, the first part of the computation provides the following: $(139°44'50")-(119°00'00")/(7'30") = (55)_{32}$. A seven-bit left shift of this result yields $(KK0)_{32}$.

In step S13, the Y-direction unit code of the map data on the desired zoom level for display is computed in the same manner as in step S12. In this example, the first part of the computation yields the following: $(35°37'37")-(20°40'00")/(5') = (5J)_{32}$. A seven-bit left shift of this result provides $(MC0)_{32}$.

In step S14, an eight-byte map file name of the map data to be displayed is created by use of the results from steps S11 through S13. If the map structure code is assumed to be A in this example, the map data containing the desired location will be given an eight-byte map file name of "A7KK0MC0."

The map file name representing the map data on the desired zoom level containing the desired location is obtained in the manner described above. This makes it easy to retrieve and display a map (i.e., a map file name) containing the longitude and latitude of a given location acquired, illustratively by GPS (Global Positioning System).

Figure 20:
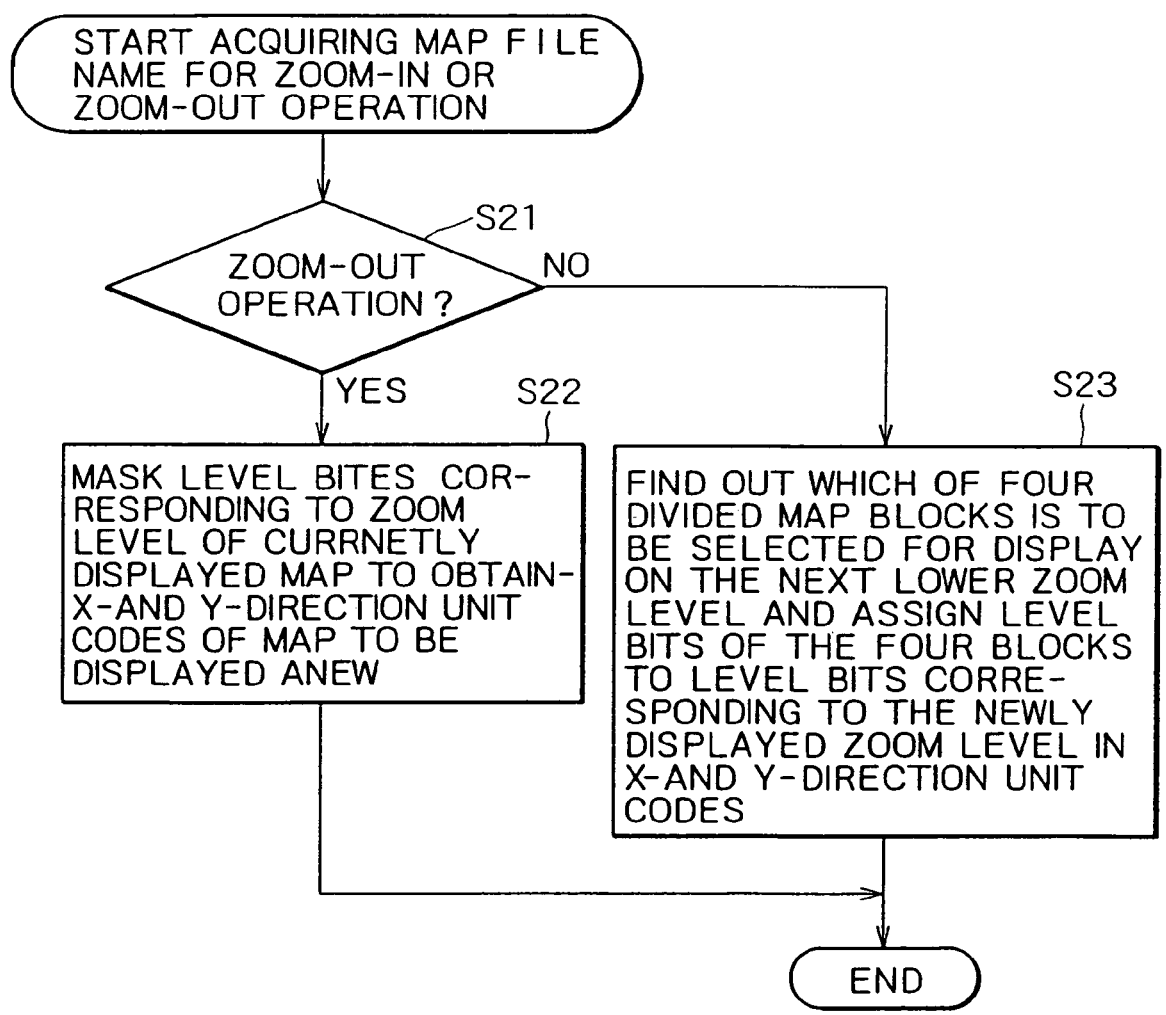
FIG. 20 is a flowchart of steps for zooming.

Described below with reference to the flowchart of FIG. 20 is how to acquire a map data file for a zoom-in or a zoom-out operation. In step S21 of FIG. 20, a check is made to see if the user has designated a zoom-out operation. The user looks up a map on the display unit, 21 (FIG. 3) of the PDA 20. If it is desired to view another map on a smaller scale containing a specific location in the currently displayed map, the user designates a zoom-out operation by operating the zoom-keys 23-2. The data resulting from the user's operation are output to the CPU 31 which in turn carries out the following steps:

If in step S21 a zoom-out operation is judged to be designated, step S22 is reached in which the zoom-out operation is performed. Zooming between maps having the same structure code involves shifting up or down the zoom level of the currently displayed map. In the case of the zoom-out operation, the X- and Y-direction unit codes in the map file name of the map to be displayed anew are obtained by masking the level bit corresponding to the zoom level of the currently displayed map (i.e., clearing the bit to zero).

The process above is explained below in more detail by use of a specific file name with reference to FIG. 21. If the map file name of the map data currently looked up by the user is, say, "A5L60CJ0," then the zoom level is "5" and the level bit is "6" according to FIG. 13. It can also be seen that the X- and Y-direction unit codes are "L60" and "CJ0" respectively.

The code "L60" is expressed as "10101 00110 00000" and the code "CJ0" as "01100 10011 00000" in binary notation. In this example, the level bit is "6" and the sixth bits are 0 and 1. Masking the sixth bits (i.e., clearing them to zero) brings about the X-direction unit code of "10101 00110 00000"="L60" (unchanged) and the Y-direction unit code of "01100 10010 00000"="CI0."

Thus designating a zoom-out operation on the map data with the map file name "A5L60CJ0" effects a transition to the map data having the map file name "A6L60CI0."

If in step S21 the user is judged to have designated a zoom-in operation and not a zoom-out operation, step S23 is reached in which the zoom-in process is carried out. This process involves first finding out which of the four divided map blocks on the next lower zoom level is to be reached for display and then assigning the level bits of the four divided map blocks to the level bits corresponding to the new-display zoom level in the X- and Y-direction unit codes.

Figure 21:
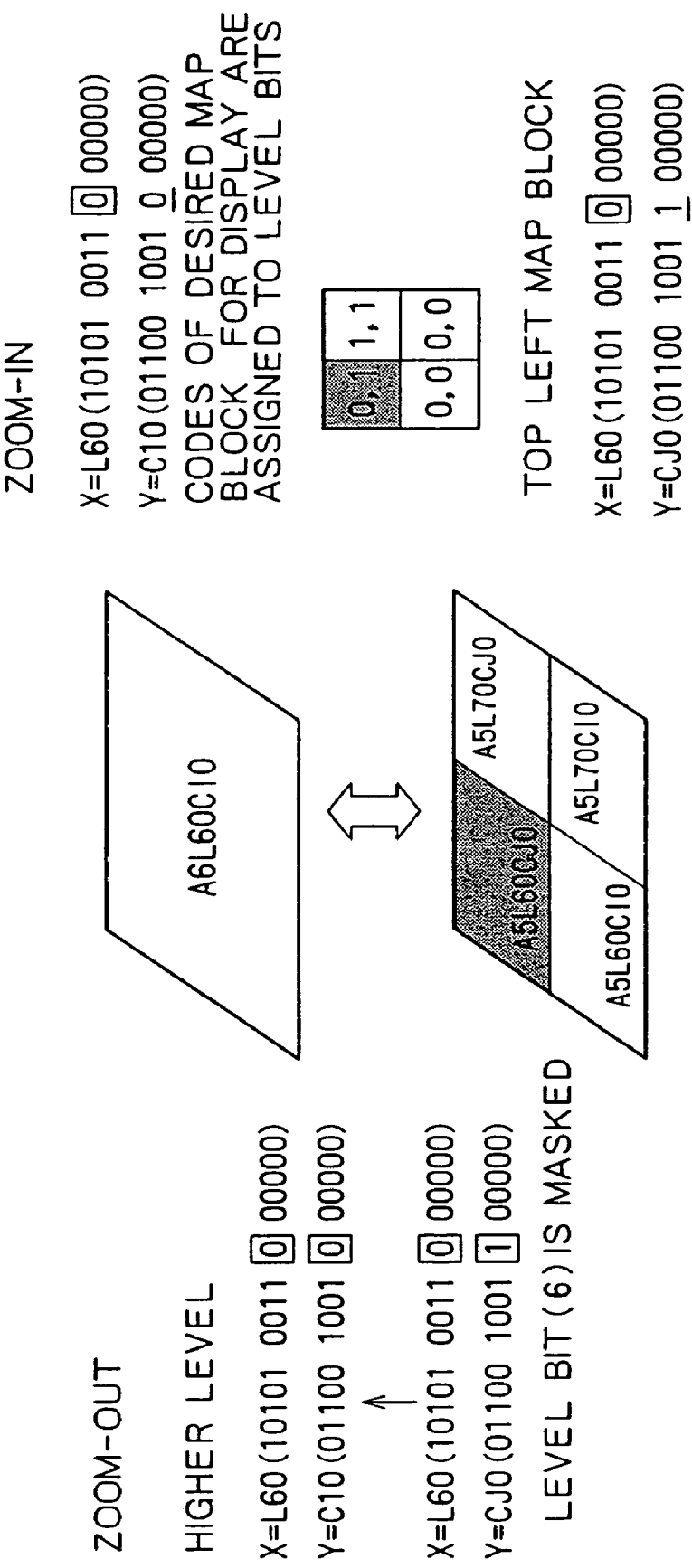
FIG. 21 is a schematic view explaining zooming.

Referring to FIG. 21, if the map data currently referenced by the user has a map file name of, say, "A6L60CI0," then the zoom level is "6" and the level bit is "7" according to FIG. 13. It can also be seen that the X- and Y-direction unit codes are "L60" and "CI0" respectively.

The code "L60" is expressed as "10101 00110 00000" and the code "CI0" as "01100 10010 00000" in binary notation. In this example, the level bit of the zoomed-in map is "6" because the level bit of the current map data is "7." The sixth bits are 0 and 0. As shown in FIG. 21, the zoomed-in map is any one of the four divided map blocks derived from the map on the next smaller scale. On the lower level, level bits (0, 1) are assigned to the top left map block, (0, 0) to the bottom left map block, (1, 1) to the top right map block, and (1, 0) to the bottom right map block.

Suppose that the zoom-in operation involves moving from the map on the current level to the top left map block on the next lower level. Since the top left map block has the assigned level bits (0, 1), the level bits are assigned to the sixth bit position in the map data having the file name "A6L60CI0." Assigning the level bits this way brings about the X-direction unit code of "10101 00110 00000"="L60" (unchanged) and the Y-direction unit code of "01100 10011 00000"="CJ0" for the newly displayed map.

Thus designating a zoom-in operation on the map data with the map file name "A5L60CI0" effects a transition to the map data having the map file name "A6L60CJ0."

In the example above, zoom-out and zoom-in operations were shown carried out within the same map structure. Alternatively, zoom-out and zoom-in operations may be performed across different map structures. This makes it possible to perform a zoom-in or a zoom-out operation to call up maps 1.5 times as large or as small as the current map per side on the next larger or smaller scale.

Figure 22:
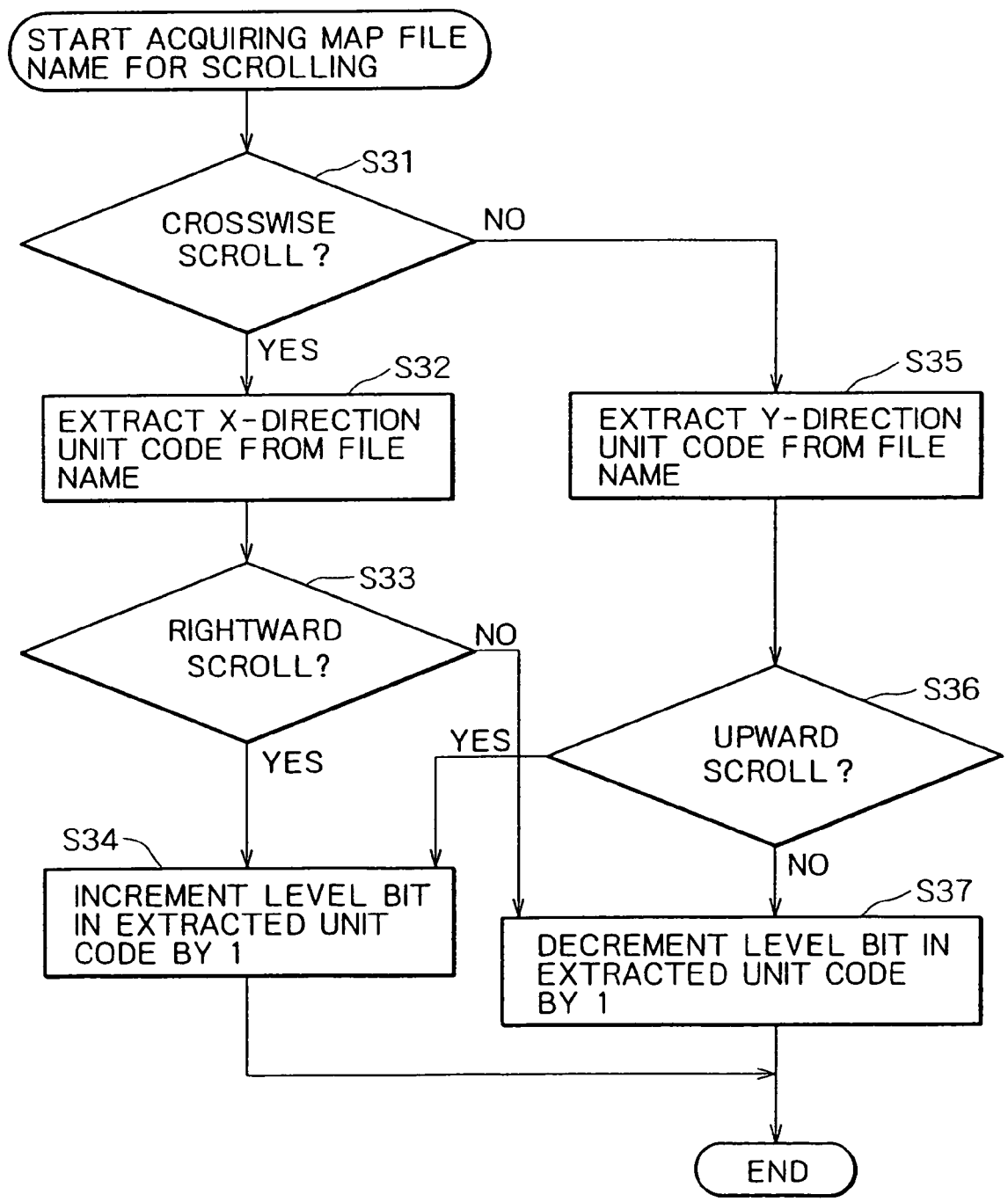
FIG. 22 is a flowchart of steps for scrolling.

Described below with reference to the flowchart of FIG. 22 is how to acquire a map data file upon scrolling. In step S31 of FIG. 22, a check is made to see if a crosswise scroll operation is designated. If it is desired to scroll the currently referenced map, the user designates a scroll operation by operating the scroll keys 23-1 (FIG. 2). The data resulting from the user's operation are output to the CPU 31 which in turn causes the PDA 20 to carry out the following steps:

If in step S31 a crosswise scroll operation is judged to be designated by the user, step S32 is reached in which the X-direction unit code is extracted from the map file name. In step S33, a check is made to see if a rightward scroll operation is designated. If in step S33 the rightward scroll operation is judged to be designated, step S34 is reached.

In step S34, the level bit in the X-direction unit code extracted in step S32 is incremented by 1. This creates the map file name of the map data to be reached by scroll.

The process above is explained below in more detail with specific numbers in reference to FIG. 23. Suppose that the map file name of the map currently looked up by the user is "A5L60CJ0." In that case, the X-direction unit code of "L60" is extracted in step S32. The level bit is "6" because the zoom level is "5." Since the code "L60" is expressed as "10101 00110 00000" in binary notation, the sixth bit is 0. Incrementing the sixth bit by 1 in step S34 thus yields 1.

After the process, the X-direction unit code is transformed into "10101 00111 00000"="L70." Thus the map file name of the map data subject to the rightward scroll operation is given as "A5L70CJ0."

Returning to the flowchart of FIG. 22, suppose that a leftward scroll operation is judged to be designated instead of the rightward scroll in step S33. In that case, step S37 is reached in which the level bit in the X-direction unit code extracted in step S32 is decremented by 1. This gives the map file name of the map data to be reached by scroll.

Figure 23:
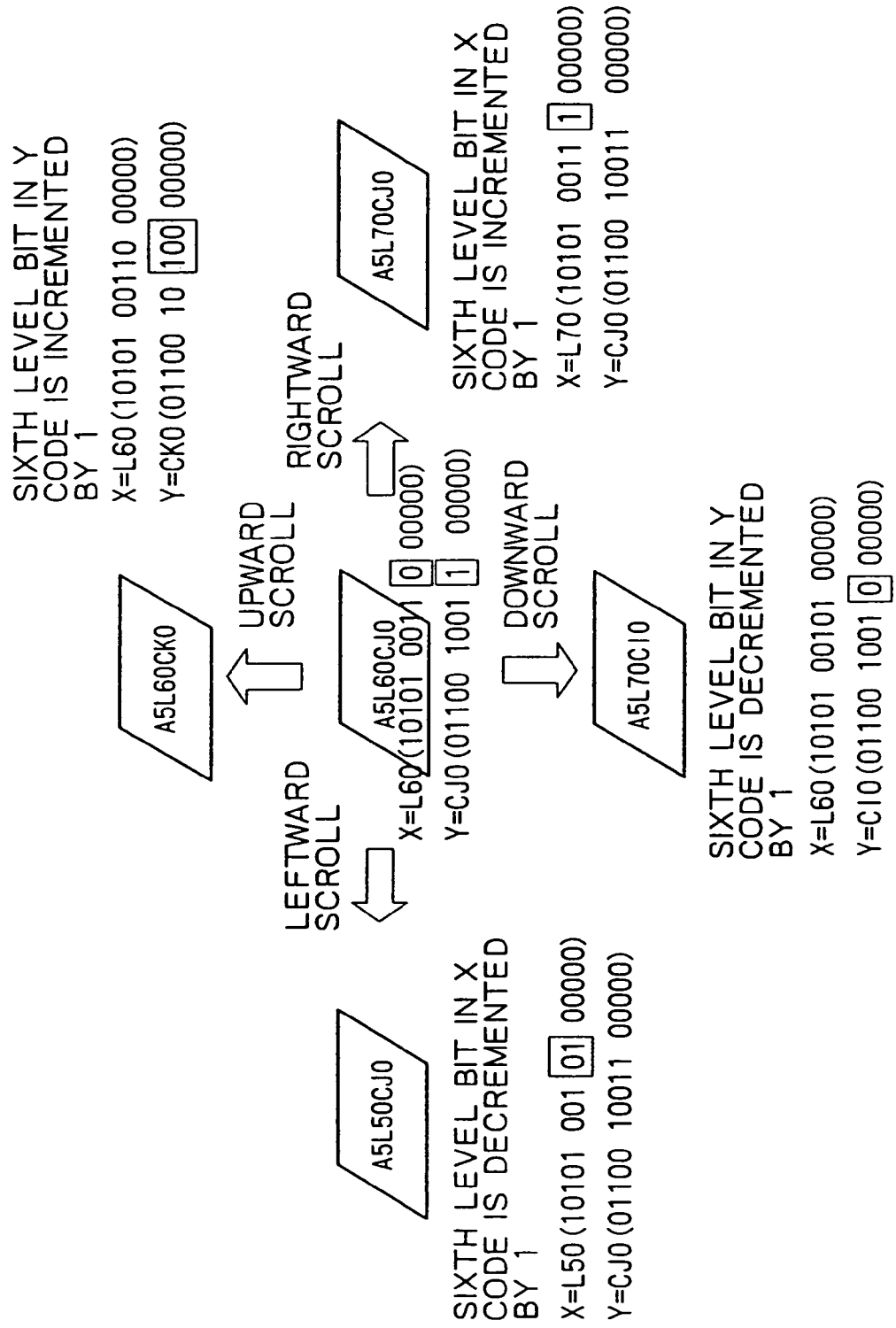
FIG. 23 is a schematic view explaining scrolling.

Referring to FIG. 23, suppose that the map file name of the currently displayed map is "A5L60CJ0," the same as in the rightward scroll operation. The sixth bit is "0" because the X-direction unit code is "L60." Decrementing the sixth bit by 1 sets the seventh bit to 0 and the sixth bit to 1. As a result, the X-direction unit code of the target map data for the leftward scroll operation is "L50" and the map file name is "A5L50CJ0."

Returning to the flowchart of FIG. 22, suppose now that the crosswise scroll operation is not judged to be designated in step S31, i.e., that a lengthwise scroll operation is judged to be specified instead. In that case, step S35 is reached in which the Y-direction unit code is extracted from the map file name. In step S36, a check is made to see if the designated scroll is an upward scroll operation.

If in step S36 an upward scroll operation is judged to be designated, step S34 is reached in which the level bit in the extracted Y-direction unit code is incremented by 1. This creates the map file name of the map to be reached by upward scroll.

If in step S36 a downward scroll operation is judged to be designated, step S37 is reached in which the level bit in the extracted Y-direction unit code is decremented by 1. This gives the map file name of the map to be reached by downward scroll.

Where the upward scroll operation is designated, the same process as that of the rightward scroll operation is carried out; where the downward scroll operation is specified, the same process as that of the leftward scroll operation is performed. Because the processes are basically the same, their descriptions are redundant and thus will not be repeated with reference to FIG. 23.

In the example above, the scroll operations were shown carried out in the same map structure. Alternatively, scrolling may be performed across overlapping map structures.

Figure 24:
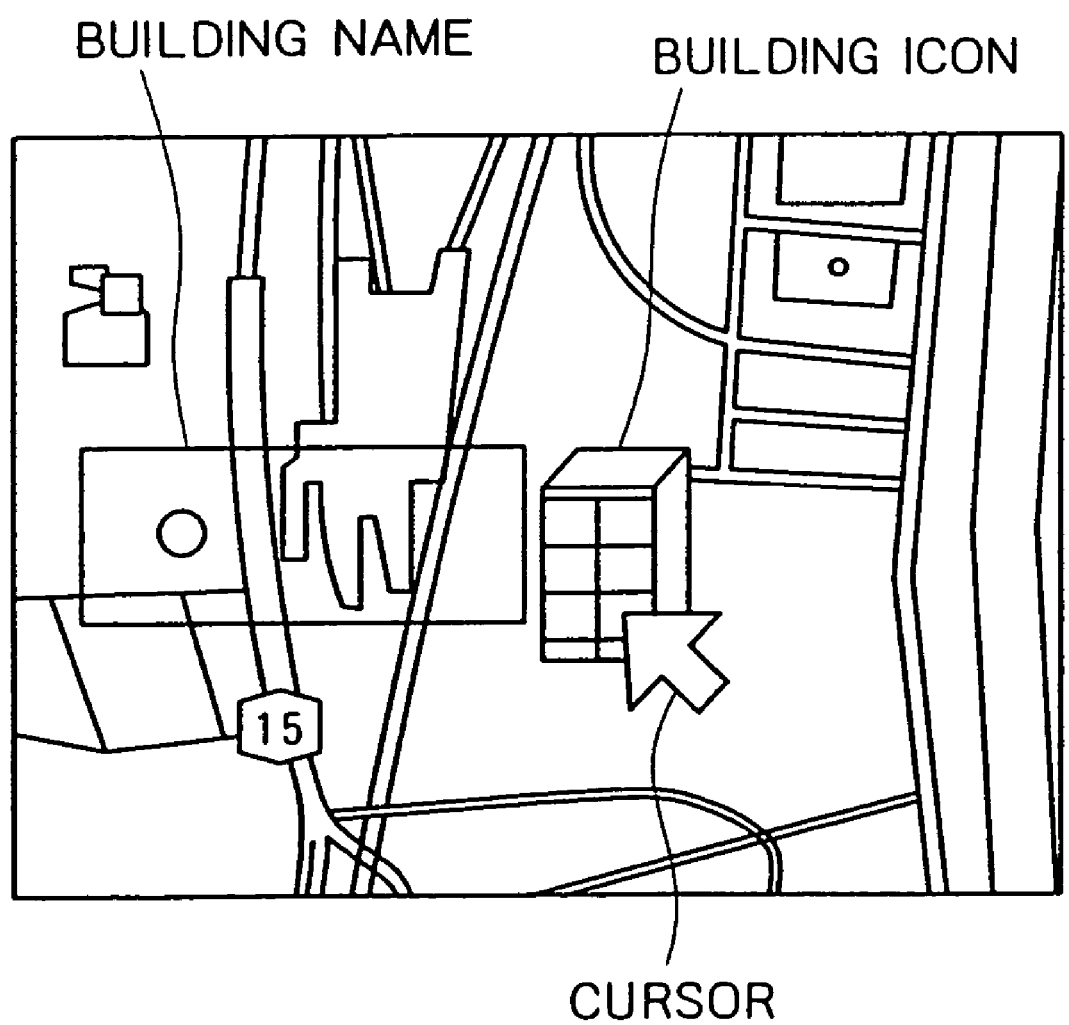
FIG. 24 is a schematic view showing a typical map on display.

The user may search for a desired location through zooming and scrolling. After the search, a map such as one shown in FIG. 24 will appear on the display unit 21 (FIG. 3). The map displayed on the display unit 21 indicates a building icon(s), a building name(s) corresponding to the icon(s), and a cursor. The building icon may be arranged to appear only if the cursor is nearby or may appear continuously regardless of the cursor position. The building name may be arranged to appear only when the corresponding building icon is displayed, or may be displayed in large letters while the cursor is nearby.

Any building with its icon on display indicates that there are provided maps showing the interior of the building. Described below with reference to the flowchart of FIG. 25 is the process performed by the PDA 20 for a transition of display from the geographical map such as one in FIG. 24 to a map showing the building interior (referred to as the floor map where appropriate).

Figure 25:
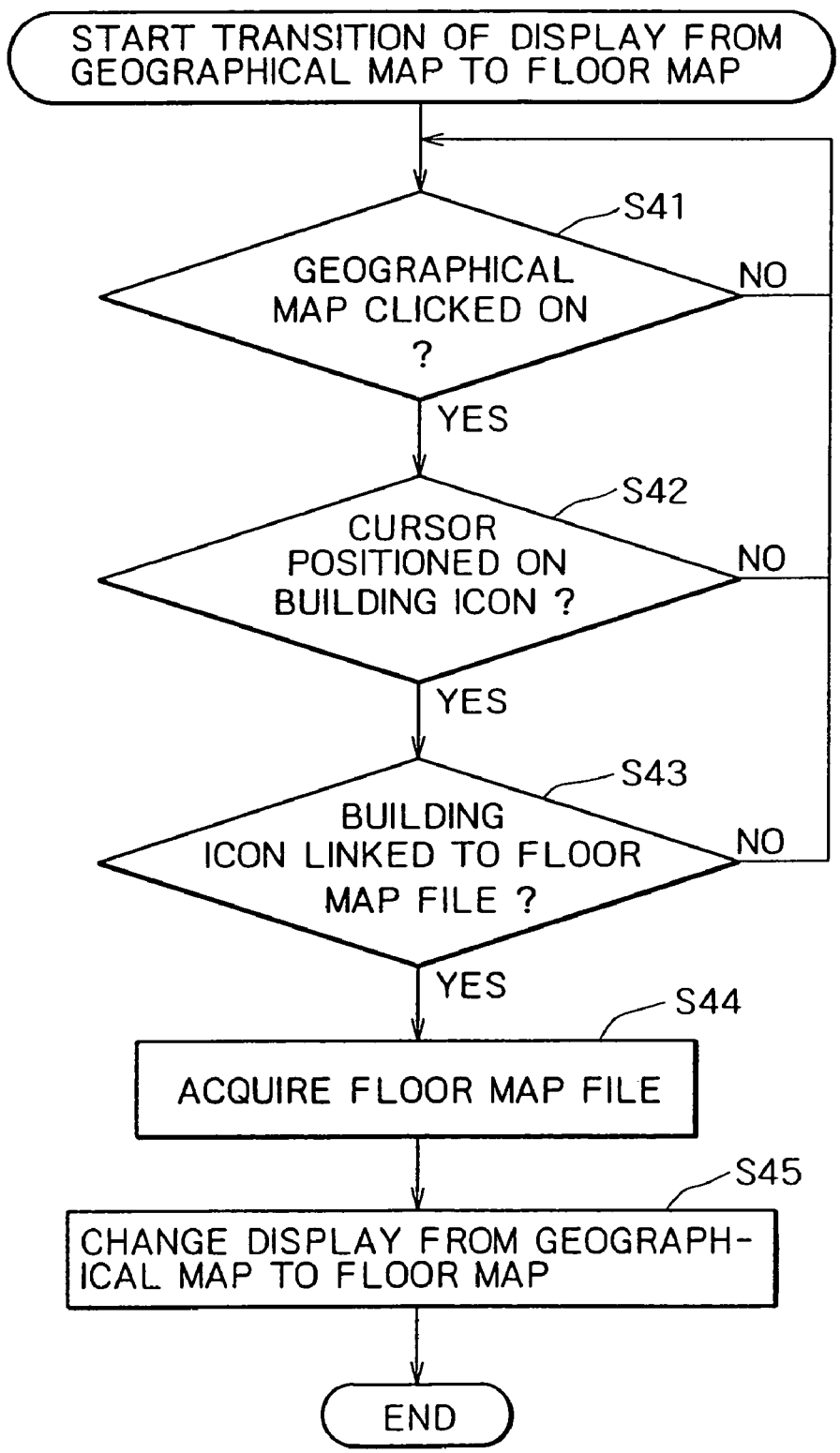
FIG. 25 is a flowchart of steps for map status transition.

In step S41 of FIG. 25, a check is made to see if a click operation is made on the geographical map (e.g., map in FIG. 24) currently displayed on the display unit 21. Step S42 is reached only if such a click operation is detected. A click operation is performed illustratively by hitting the enter key 23-3 twice in a row or by tapping twice the touch pad successively on the display unit 21.

In step S42, a check is made to see if any building icon exists where the cursor is located. If any building icon is judged to exist where the cursor is positioned, step S43 is reached. If no building icon is found where the cursor is located, step S41 is reached again and the subsequent steps are repeated.

In step S43, a check is made to see if the building icon is linked to any floor map file. This step is provided because there can be building icons not linked to any floor map file at all. If in step S43 the building icon is judged to be linked to a floor map file, step S44 is reached. Otherwise step S41 is reached again and the subsequent steps are repeated.

In step S44, the linked floor map file is read from the Memory Stick 45. In step S45, the display on the display unit 21 is changed from the geographical map to a floor map based on the retrieved floor map file.

Figure 26C:
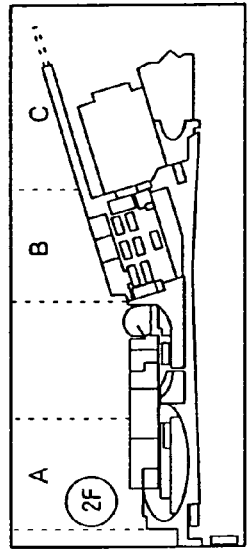
FIGS. 26A through 26D are schematic views explaining map status transition.
Figure 26D:
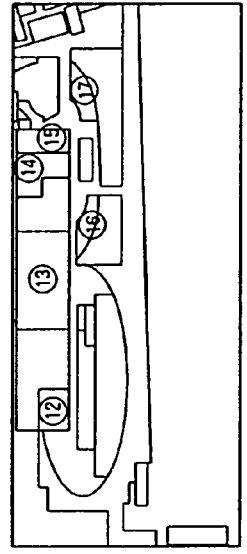
Figure 26A:
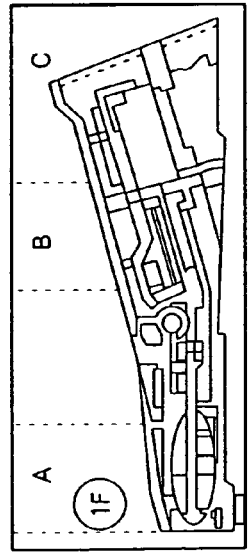

The floor map initially called up in that manner generally depicts the first floor of the building in question. Depending on the characteristics of the building, another floor may be displayed by default. Typical floor maps are shown in FIGS. 26A through 26D. Upon transition from the geographical map, the initial floor map to appear generally concerns an overall first floor layout as shown in FIG. 26A.

Figure 26B:
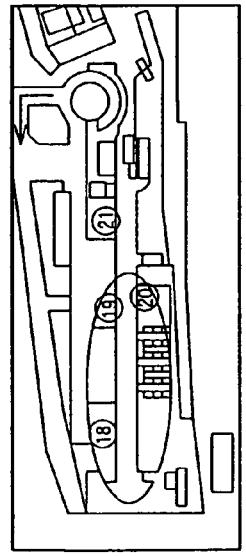

When a scroll operation is designated in the display state of FIG. 26A, another map such as one in FIG. 26B is brought into display. When an upper floor is designated (second floor in this example), another map such as one in FIG. 26C is called up. It is possible to scroll the second floor map as indicated in FIG. 26D if a scroll operation is specified. It is also possible to change from the state of FIG. 26B to that of FIG. 26C.

Figures 27, 28:
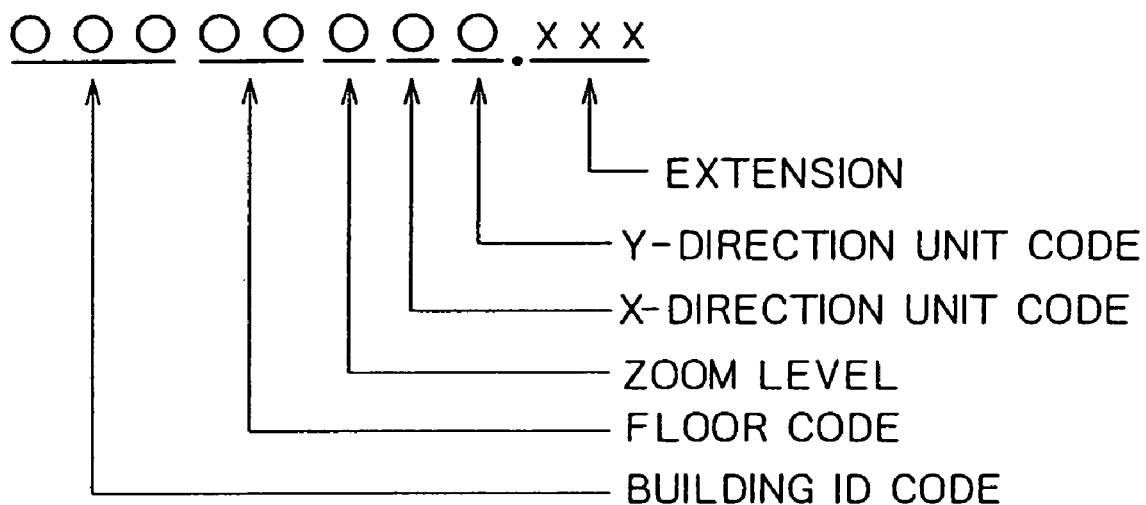
FIG. 27 is a schematic view explaining a floor file name.
FIG. 28 is a tabular view of correspondence between zoom levels and level bits.

Floor map files each have a floor file name as shown in FIG. 27. The file name is constituted by an eight-byte file name and a three-byte extension. As with the map file name (FIG. 7), the extension of the floor file name indicates a compression method by which map data are stored in the file. There are such extensions as JPG (Joint Photograph Experts Group), PNG (Portable Network Graphics) and SVG (Scalable Vector Graphics) representative of the respective compression standards.

The first three characters of the eight-byte file name denotes a building identification code, each character being any one of the alphabetic characters A through Z. The building identification code serves to identify buildings and facilities in, say, an underground shopping center. Since each of the three characters can identify 26 objects (i.e., A through Z), the three characters in combination can identify up to 17,576 buildings or facilities (i.e. 26×26×26).

The fourth and the fifth character in the eight-byte floor file name constitute a floor code to identify floors in their vertical location in the building. For identification of floors above the ground, the floor code is expressed in hexadecimal notation ranging from "01" to "FF" representing up to the 255th floor. For identification of floors below the ground, the floor code ranges from "U1" to "U9" denoting the first through the ninth floor below the ground. The rooftop is expressed as "RF."

Each floor map is subject to zooming display (zoom-in and zoom-out). The sixth character in the eight-byte floor file name is assigned to a zoom level representing the magnification of the floor map. A floor map covering the entire floor is given a zoom level of "5." The higher the magnification, the lower the corresponding zoom level numeral (i.e., the highest level of "5" is followed by "4," "3," "2," "1" and "0" in that order).

The area size of the floor map remains the same on the same zoom level, and one of two floor maps on any two adjacent zoom levels is twice as large or as small as the other map per side. However, there is no constraint on the extent of the smallest scale floor map (zoom level "5") serving as the reference to all other floor maps; any desired rectangular area may be established as the smallest scale floor map.

The seventh and the eighth character in the eight-byte floor file name represent an X- and a Y-direction unit code respectively. These codes, each expressed by a number with the radix 32, indicate where the floor map in question is located horizontally on the same zoom level. Each unit code has a level bit corresponding to the zoom level, as shown in FIG. 28. The level bit value determines where the floor map is located vertically in the building. For the zoom level "5" representative of a floor map covering the entire floor, the unit codes are both "0" in the X and Y directions.

Figure 29:
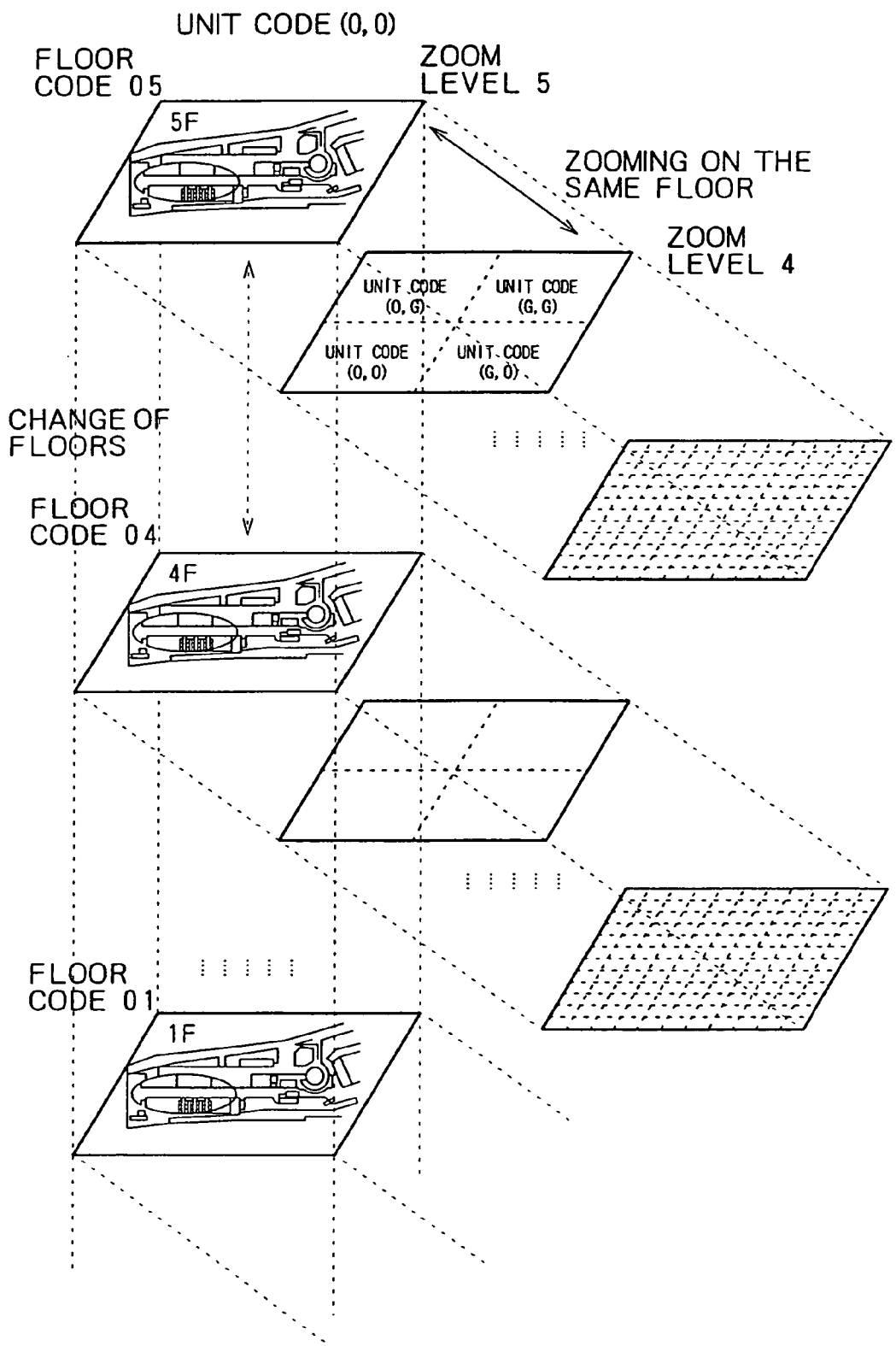
FIG. 29 is a schematic view depicting examples of floor view change and zooming.

FIG. 29 illustrates typical transitions between maps of different floors as well as between floor maps zoomed in and out on each floor. As shown in FIG. 29, it is possible to shift the display between floors as well as between floor maps on larger and smaller scales on the same floor.

Figure 30:
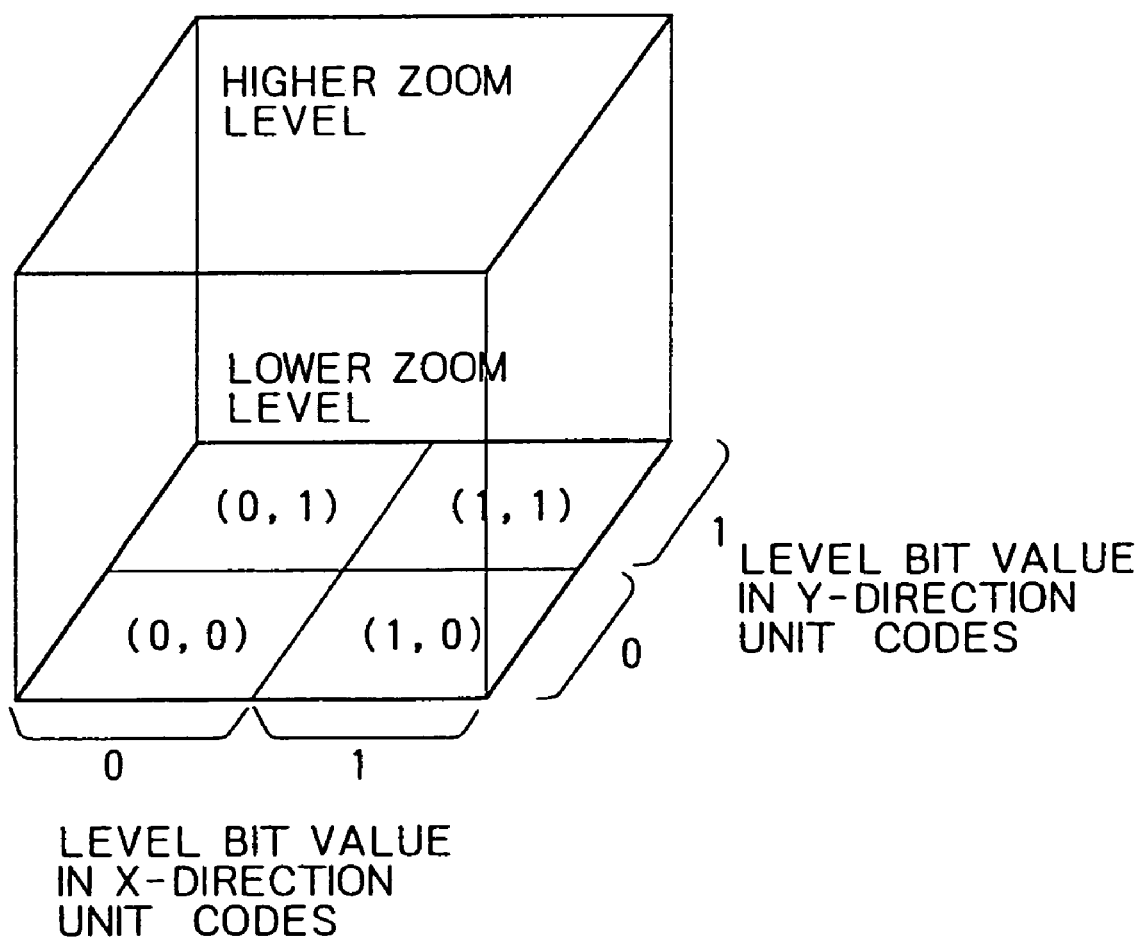
FIG. 30 is a schematic view explaining zoom level bits.

As shown in FIG. 30, one floor map is associated with four divided map blocks on the next lower zoom level. The map blocks are expressed by coordinates of bits (0, 0), (1, 0), (0, 1) and (1, 1) in the X and Y directions. The bits thus assigned are associated with the level bits of zoom levels.

Figure 31:
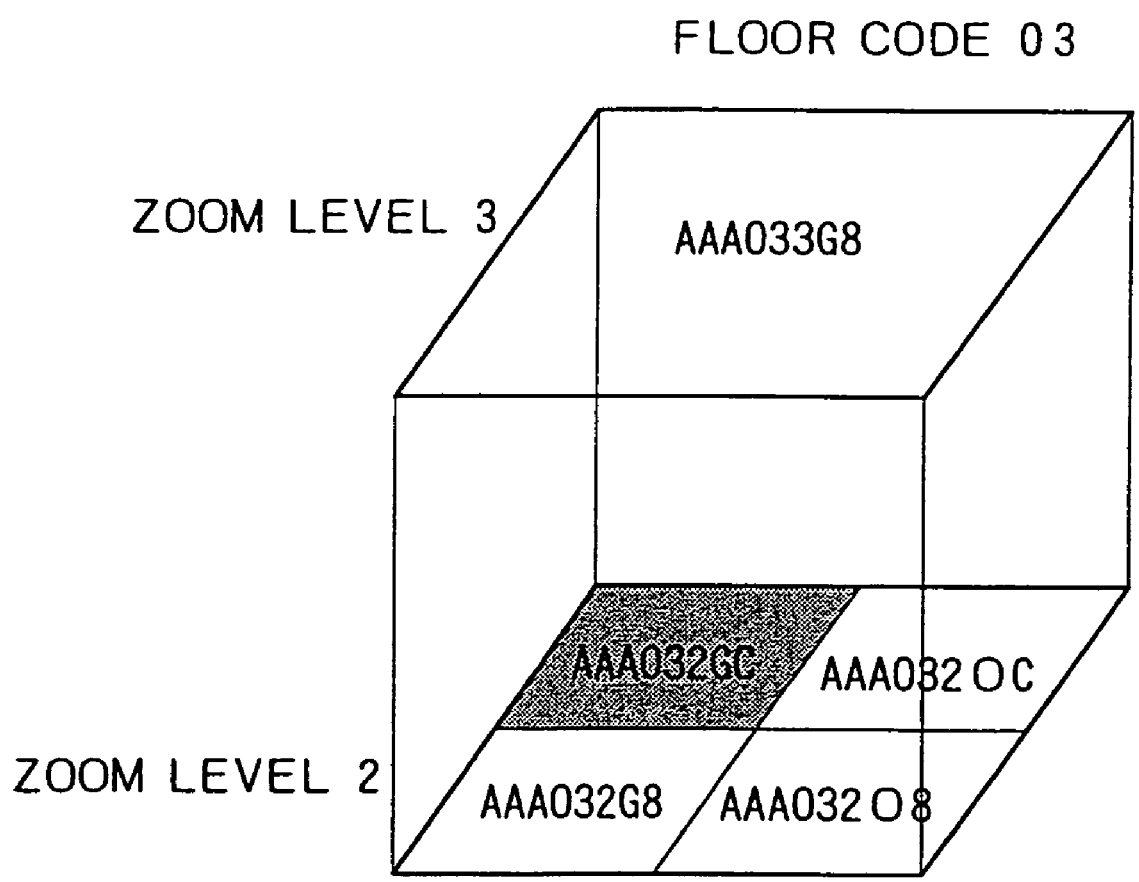
FIG. 31 is another schematic view explaining zoom level bits.

FIG. 31 shows an example of level bit assignments. It is assumed that the file name of a floor map is "AAA033G8" signifying that the building identification code is AAA, that the floor code (03) represents the third floor above ground, and that the zoom level is "3." The X- and Y-direction unit codes are expressed as "G" and "8" respectively, or "10000" and "01000" in binary notation. Because the next lower zoom level (i.e., of greater magnification) of the current floor map is "2," the corresponding level bit is "3" according to FIG. 28. That is, the changed bit on the next lower level is the third bit in the binary number. The unit codes of the shaded map block in FIG. 31 are (0, 1) following the level bit change, so that "10000"="G" and "01100"="C." This gives an eight-byte file name of "AAA032GC."

As described, the X- and Y-direction unit codes are each expressed in a one-byte number with the radix 32. This makes it possible to represent magnified floor maps corresponding to a maximum of six zoom levels starting from a single floor map.

The floor map data file having its floor file name defined as described contains not only floor map image data but also header information as listed in FIG. 32. The header information is itemized as follows: an X- and a Y-direction dot count for describing the size in drawing a floor map; an X- and a Y-direction real distance for expressing the scale of the floor map; the orientation of the floor map; and latitudes and longitudes of four corners of the floor map area, used to draw the floor map in terms of geographical coordinates.

Figure 17:
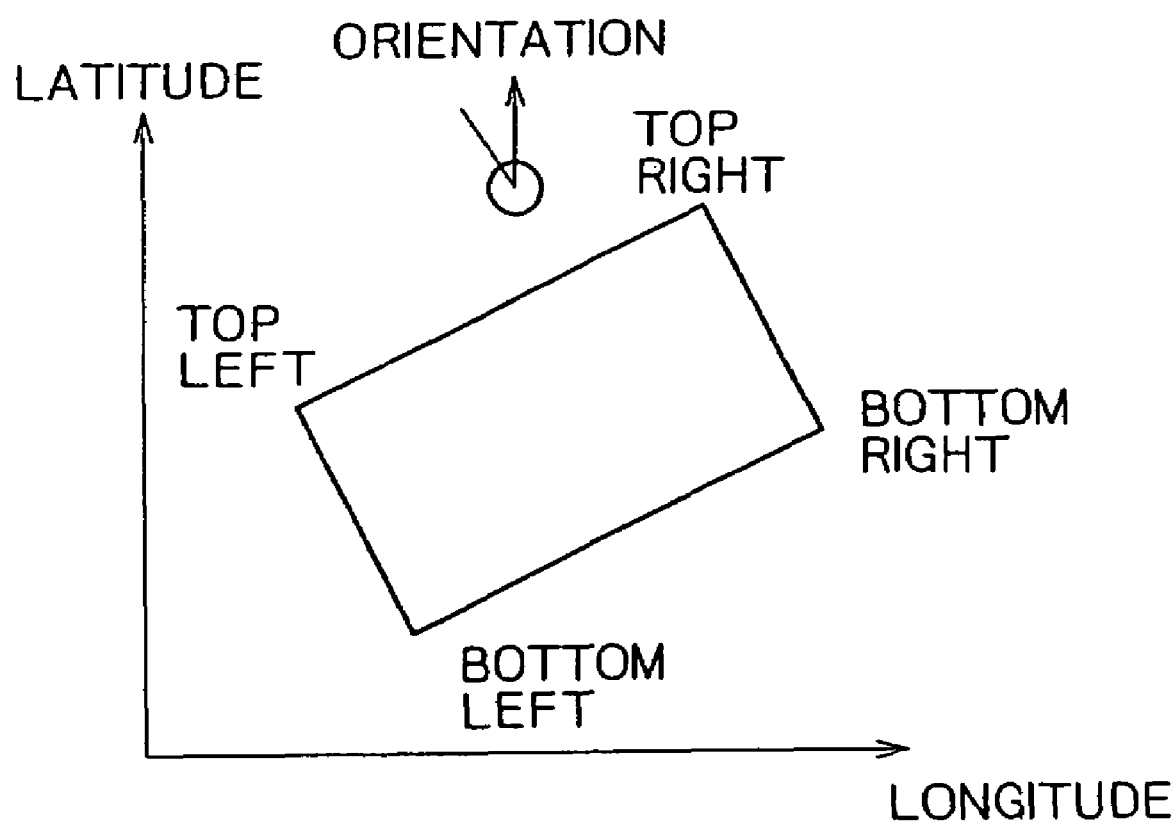
FIG. 17 is a schematic view illustrating map orientation.

The latitudes and longitudes of the four corners of each floor map as well as its direction are provided so as to store data of the floor map whose top is not oriented toward the north, as in the case of geographical map such as one shown in FIG. 17. In many cases, the map of a building is easier to look up when its entrance is located at the bottom of the map. This often entails getting the map oriented toward any suitable point other than the north.

The latitude and longitude may each be given in degrees, minutes and seconds. The seconds may be given down to three decimal places, expressing a minimum distance of about 3 cm. The information header includes the highest floor above ground excluding the rooftop, and the lowest basement level below ground. These are parameters that are effective when used to change floor map displays.

Figure 33:
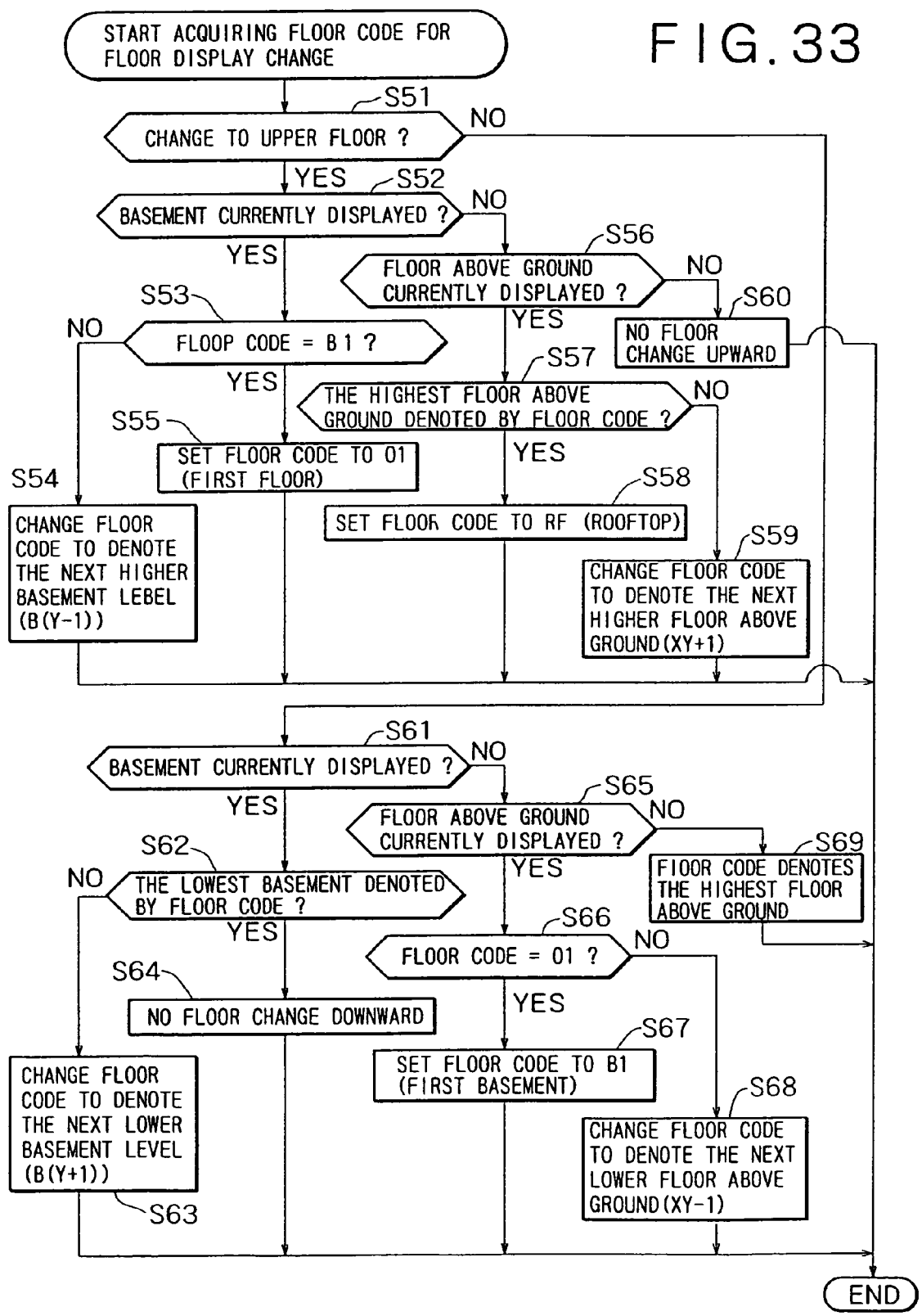
FIG. 33 is a flowchart of steps for a floor view change operation.

Described below are steps carried out by use of floor map files that are each managed using the floor file name explained above. First to be described with reference to the flowchart of FIG. 33 is a process for acquiring a floor code upon change of floors in floor maps. In step S51 of FIG. 33, a check is made to see if a change to an upper floor is designated by the user. The user specifies a change of floor display illustratively using the jog dial 24. Alternatively, a floor change key (not shown) may be furnished on the PDA 20 to make the floor change designation.

If in step S51 a change to an upper floor is judged to be designated, step S52 is reached. In step S52, a check is made to see if the currently displayed map concerns a basement level. If in step S52 the currently display map is judged to represent a basement, step S53 is reached. In step S53, a check is made to see if the floor code is "B1" in the floor file name of the current map. As explained earlier, the floor file name contains the floor code indicating where the floor is located vertically inside the building of interest. The code "B1" denotes a first basement level. If in step S53 the floor code is not judged to be "B1," then step S54 is reached.

In step S54, the floor code is changed to one in which the basement is raised one level upward. This gives the floor file name of the new floor to be reached for display. That is, if the change of display is toward an upper floor and if the currently displayed floor map represents a basement, the floor code need only have the numeral in its second character position decremented by 1 while leaving the first-position character unchanged ("B"). This provides the floor file name of the floor map to be displayed anew. The new floor map is displayed on the display unit 21 by retrieving the map file having the floor file name thus created.

If in step S53 the floor code is judged to be "B1," then step S55 is reached. In step S55, a new floor file name is created in which the floor code is changed to "01" (first floor). That is, because a change of display toward an upper floor is designated on the first basement level (B1), the new floor map to be displayed is that of the first floor defined by the floor code "01."

If in step S52 the currently displayed map is not judged to be a basement, step S56 is reached in which a check is made to see if the map shows a floor above ground. If in step S56 the currently displayed map is judged to concern a floor above ground, step S57 is reached in which a check is made to see if the floor code indicates the highest floor above ground. If in step S57 the floor code is judged to indicate the highest floor above ground, step S58 is reached in which the floor code is changed to "RF" (rooftop). This creates the floor file name of the new floor map to be reached.

If in step S57 the floor code is not judged to denote the highest floor above ground, step S59 is reached in which the floor code is incremented by 1. This provides the floor file name of the new floor map to be displayed.

If in step S56 the currently displayed map is not judged to denote a floor above ground, that means the map in question is neither above nor under ground. The corollary of this judgment is that the map is representative of the rooftop. In that case, step S60 is reached in which the display unit 21 is arranged to display a message or other suitable indication telling the user that there is no further going up from the current rooftop.

When a change to an upper floor is designated, the floor file name of the destination floor is generated in the manner described. A map file based on the floor file name is retrieved from the Memory Stick 45. A map derived from the retrieved map file is then displayed on the display unit 21.

If in step S51 a change to a lower floor is judged to be designated by the user, step S61 is reached. In step S61, a check is made to see if the currently displayed map concerns a basement level. If in step S61 the current map is judged to be a floor map of a basement, step S62 is reached in which a check is made to see if the floor code represents the lowest basement. If in step S62 the floor code is not judged to denote the lowest basement, step S63 is reached in which the floor code is incremented by 1 to represent the next lower basement level. This gives the floor file name of the floor map to be displayed anew.

That is, if the designated change of floor display is toward a lower floor and if the currently displayed floor map represents a basement, the floor code need only have the numeral in its second character position incremented by 1 while leaving the first-position character unchanged ("B"). This provides the floor file name of the new floor map for display. The new floor map is displayed on the display unit 21 by retrieving the map file having the floor file name thus created.

If in step S62 the floor code is judged to denote the lowest basement level, step S64 is reached. In step S64, the display unit 21 is arranged to display a message or other suitable indication telling the user that there is no further going down from the current floor.

If in step S61 the currently displayed map is not judged to represent a basement, step S65 is reached in which a check is made to see if the map in question denotes a floor above ground. If in step S65 the currently displayed map is judged to represent a floor above ground, step S66 is reached in which a check is made to see if the floor code is "01." If the floor code is judged to be "01," then step S67 is reached.

If in step S67 the floor code is judged to be "01," that means the change to a lower floor is designated when the floor map of the first floor above ground is in effect. In that case, the floor code is changed to "B1" (first basement) when the new floor file name is created. If in step S66 the floor code is not judged to be "01," step S68 is reached in which the floor code is changed to represent the next lower basement level, thus creating the floor file name of the destination floor to be reached for display.

If in step S65 the currently displayed map is not judged to denote a floor above ground, the corollary of this judgment is that the map is representative of the rooftop. In that case, the floor code is changed to denote the highest floor above ground, i.e., one floor below the rooftop, and the floor file name of the destination floor is created accordingly.

The designated change of display to the lower floor causes the floor file name of the destination floor to be prepared in the manner described. A map file based on the prepared floor file name is retrieved from the Memory Stick 45, and a map derived from the retrieved map file is displayed on the display unit 21.

Figure 34:
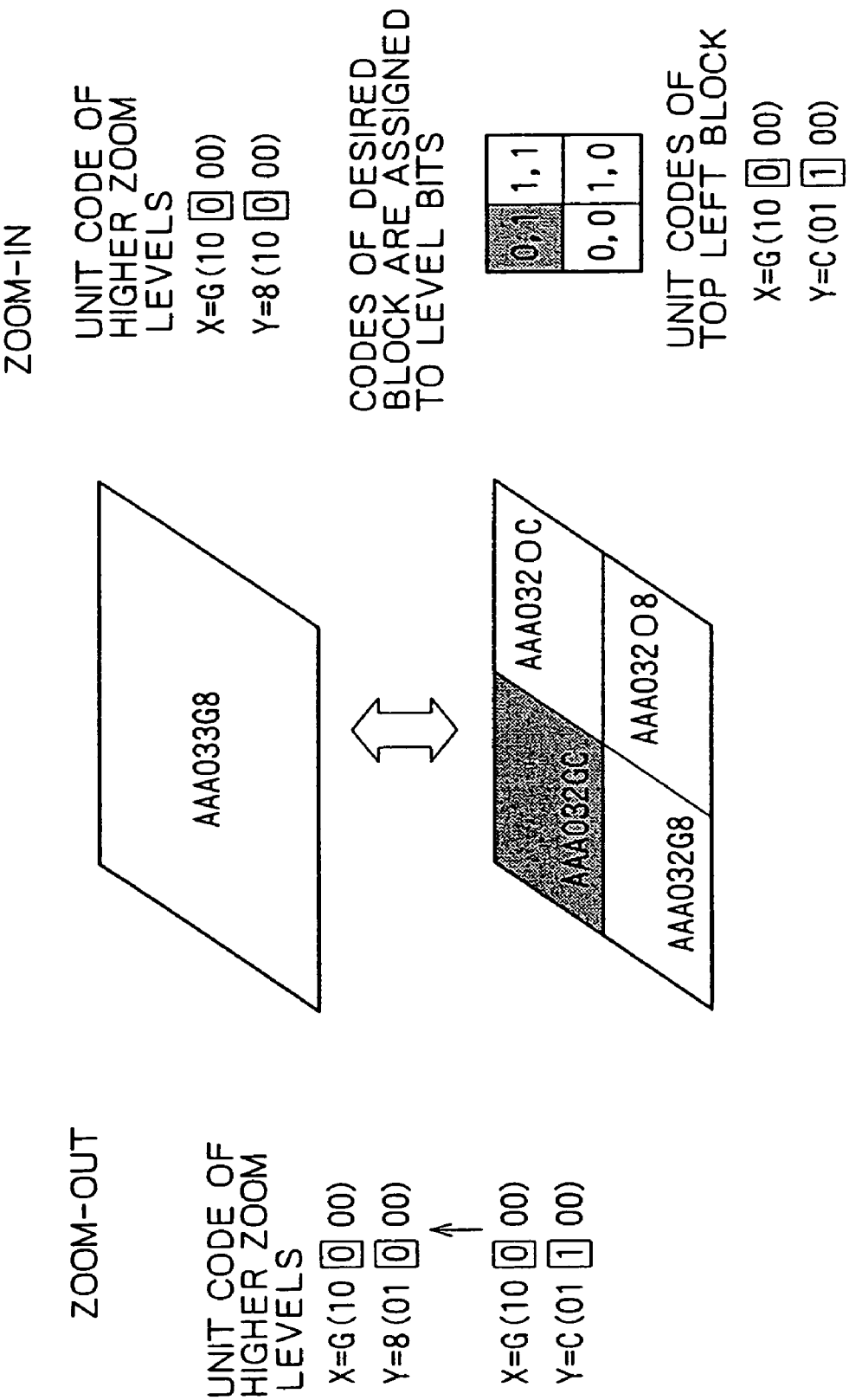
FIG. 34 is a schematic view explaining zooming.

Zoom-in and zoom-out operations on the same floor are outlined below. The processes involved are basically the same as those discussed above regarding geographical maps in reference to the flowchart of FIG. 20, so that the processes will not be described further in detail. Still, zoom-in and zoom-out processing on the same floor is explained briefly below using specific floor file names in reference to FIG. 34.

Suppose now that the currently displayed floor map has a floor file name "AAA032GC." This means that the X- and Y-direction unit codes are "G" and "C" respectively (="10000" and "01100" in binary notation). For a zoom-out operation based on that file name, the level bit "4" (see FIG. 28) corresponding to the zoom level "3" in the unit codes of the current display is masked (i.e., cleared to zero) This sets the Y-direction unit code to "8" (="01000") while leaving the X-direction unit code at "G" (="10000," unchanged). As a result, the destination floor to be reached for the zoom-out operation is given the floor file name of "AAA033G8."

When the currently displayed floor map has the floor file name "AAA033G8," the X- and Y-direction unit codes are "G" and "8" respectively (="10000" and "01000" in binary notation). For a zoom-in operation based on that file name, it is necessary initially to determine which of the four divided map blocks on the next larger scale is to be reached. The level bit "4" corresponding to the zoom level "3" of the new display in the X- and Y-direction unit codes is assigned the relevant level bit values (0, 1). This gives the floor file name "AAA032GC" of the destination floor to be reached for the zoom-in operation.

Figure 35:
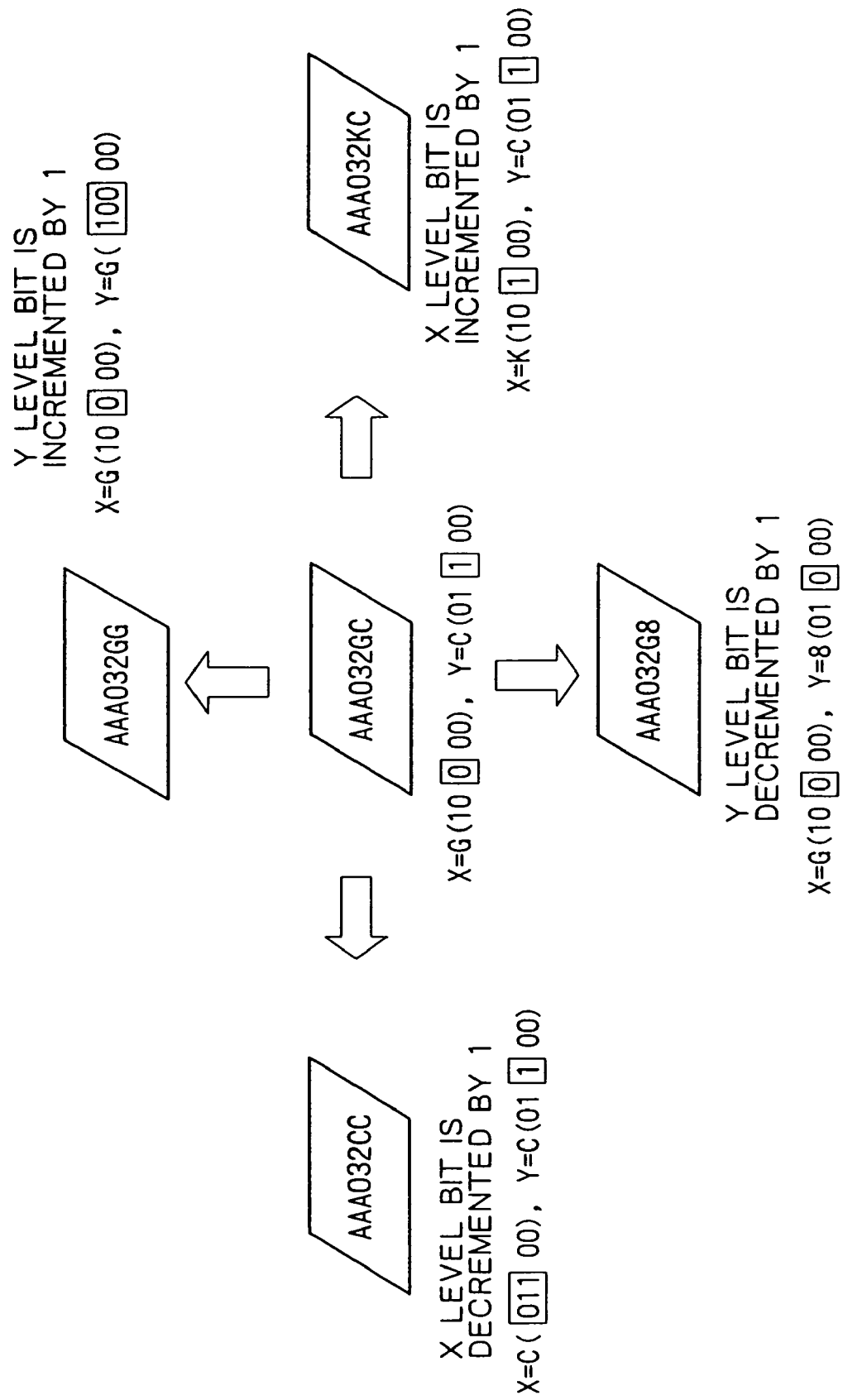
FIG. 35 is a flowchart of steps for scrolling.

How floor maps are scrolled is outlined below. The scrolling processes involved are basically the same as those discussed above regarding geographical maps in reference to the flowchart of FIG. 22, so that the processes will not be described further in detail. Still, scroll processing on floor maps is explained briefly below using specific floor file names in reference to FIG. 35.

For scrolling, the unit codes are obtained by incrementing or decrementing by 1 the level bit corresponding to the current zoom level. Suppose that the floor file name of the currently displayed floor map is "AAA032GC." For a rightward scroll operation, the level bit of the X-direction unit code is incremented by 1. This brings about transition to the floor map having the floor file name of "AAA032KC." For a leftward scroll operation, the level bit of the X-direction unit code is decremented by 1, which triggers transition to the floor map with the floor file name of "AAA032CC."

For an upward scroll operation, the level bit of the Y-direction unit code is incremented by 1 causing transition to the floor map with the floor file name of "AAA032GG." For a downward scroll operation, the level bit of the Y-direction unit code is decremented by 1 triggering transition to the floor map having the floor file name of "AAA032G8."

When geographical maps are replaced by floor maps inside a desired building on display in the manner described above, users are offered maps of higher usability than ever before.

According to the invention, map data that used to be stored as large-sized map data files in a mass storage medium can be stored in small-sized map data files each representing a single map. With no need for a management file that should be used to manage individual maps, a data terminal with modest CPU performance and limited memory capabilities need only read an eight-byte file name of any map data file and its header information to grasp an entire map structure comprising other map data files. The data terminal can also acquire the following: smaller and larger scale map data files for zoom-out and zoom-in operations; data files of horizontally contiguous maps for scrolling; and any map data file containing a desired location defined by a latitude and a longitude for display.

According to the invention, a plurality of map structures are combined to accommodate a more extensive area than ever before while retaining detailed map data. This makes it possible to zoom in and out of maps in more detailed steps and to feed or scroll map pages while leaving overlapping portions between adjacent maps.

Furthermore, data representing maps of any desired orientation may be stored according to the invention. The inventive method need only have a plurality of map data files covering a desired area to be displayed, not the whole data within the map structure. In other words, the map data of only necessary regions can be extracted easily from the map data on a nationwide scale. Data terminals such as portable telephones that download map data files for display have no need to download a bulky management file. Because only the relevant map data file needs to be downloaded, the time required for download is shortened and communication cost is reduced accordingly.

While data files of maps whose top is oriented toward the north were shown handled in the examples above, maps of any other orientation can be processed according to the invention. Whereas maps were shown scrolled rightward, leftward, upward and downward in the above examples, this is not limitative of the invention. Maps may alternatively be scrolled in eight directions according to the invention. The X- and Y-direction unit codes were each shown expressed in a three-digit number with the radix 32. Alternatively, other numbers may be utilized with the radix of 8, 10, 16, 36 or others.

In the examples above, the X- and Y-direction unit codes were each shown expressed in the three-digit number. Alternatively, a one-digit, a two-digit, a four-digit number or a number of more digits may be used. While the examples above were described with 16 zoom levels in use, this is not limitative of the invention. A desired number of zoom levels may be adopted instead. In addition, the above-cited JPG, PNG or SVG map data compression method may be replaced by any other suitable data compression standard.

The examples above were discussed in connection with the eight-byte file name format. Alternatively, a so-called long file name containing more than eight bytes may be employed. The inventive apparatus is compatible with display devices of diverse types including LCDs, CRTs, electroluminescence (EL) display devices and projectors. Whereas the maps when zoomed in or out were each described as getting twice as large or as small per side as the map on the next lower or higher scale, this is not limitative of the invention. Alternatively, each of two maps on any two adjacent scales may be four times, eight times, 16 times, etc., as large or as small as the other map per side.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIG. 3, the storage medium is offered to users apart from the computer not only as a package medium constituted by the magnetic disc 201 (including floppy discs), optical disc 202 (including CD-ROM (compact disc-read only memory) and DVD (digital versatile disc)), magneto-optical disc 203 (including MD (Mini-disc), a register trademark), or semiconductor memory 204; but also in the form of a ROM or a hard disc drive containing the programs and incorporated beforehand in the computer.

In this specification, the steps which are stored on a program storage medium and which describe the programs to be executed represent not only processes that are carried out in the depicted sequence (i.e., on a time series basis) but also those that are conducted parallelly or individually.

In this specification, the term "system" refers to an entire configuration made up of a plurality of component devices.

To sum up, the inventive apparatus and method create map file names which are composed of an identification code, a level code, and unit codes each and which are used to read map data managed in terms of these file names. In each map file name, the identification code identifies a map structure of a given area; the level code designates a scale level of the map within the map structure; and the unit codes indicate which part of the area is depicted by the map. The use of such map file names makes it easy to manage map data and helps lower the level of computing performance required to display maps.

Furthermore, the inventive apparatus and method create floor file names which are composed of a building identification code, a floor code, a level code, and unit codes each and which are used to read map data managed in terms of these file names. In each floor file name, the building identification code identifies the building in question; the floor code identifies a floor in the building; the level code designates a scale level of the floor map; and the unit codes indicate which part of the floor is depicted by the map. The use of such floor file names makes it easy to manage floor map data and helps lower the level of computing performance required to display floor maps.

As many apparently different embodiments of this invention may be made without departing from the spirit and scope thereof, it is to be understood that the invention is not limited to the specific embodiments thereof except as defined in the appended claims.

What is claimed is:

1. An information processing apparatus comprising:

creating means for creating file names which represent a map each and which are constituted each by an identification code for identifying a map structure of a given area; by a level code for denoting a scale level of the map; and by unit codes for indicating which part of said area is covered by said map;

reading means for reading map data managed in terms of said file names created by said creating means;

display controlling means for controlling display of maps based on said map data read out by said reading means;

zooming means for zooming geographical map data according to said level code in response to user's operation; and switching means for switching from said geographical map data to floor map of a building in response to user's designation if said geographical map data is being zoomed in to predetermined level.

* * * * *